US008539352B2

(12) United States Patent
Takata et al.

(10) Patent No.: US 8,539,352 B2
(45) Date of Patent: Sep. 17, 2013

(54) ELECTRONIC APPARATUS HAVING OPERATION GUIDE PROVIDING FUNCTION

(75) Inventors: Kazutoyo Takata, Osaka (JP); Koji Morikawa, Kyoto (JP)

(73) Assignee: Panasonic Corporation, Osaka (JP)

( * ) Notice: Subject to any disclaimer, the term of this patent is extended or adjusted under 35 U.S.C. 154(b) by 1442 days.

(21) Appl. No.: 12/162,491

(22) PCT Filed: Aug. 28, 2007

(86) PCT No.: PCT/JP2007/066612
§ 371 (c)(1),
(2), (4) Date: Jul. 29, 2008

(87) PCT Pub. No.: WO2008/026566
PCT Pub. Date: Mar. 6, 2008

(65) Prior Publication Data
US 2009/0037816 A1      Feb. 5, 2009

(30) Foreign Application Priority Data
Aug. 30, 2006    (JP) .................................. 2006-233409

(51) Int. Cl.
G06F 3/00 (2006.01)
G06F 13/00 (2006.01)
H04N 7/14 (2006.01)
H04N 5/445 (2011.01)

(52) U.S. Cl.
USPC ........................... 715/708; 348/14.05; 725/37

(58) Field of Classification Search
USPC ............... 715/705, 707, 708, 710; 348/14.05
See application file for complete search history.

(56) References Cited

U.S. PATENT DOCUMENTS 4,746,918 A * 5/1988 Dijkers et al. ................. 370/438
5,450,079 A * 9/1995 Dunaway ......................... 341/23

(Continued)

FOREIGN PATENT DOCUMENTS

JP    2002-123349    4/2002
JP    2002-373041    12/2002

(Continued)

OTHER PUBLICATIONS

International Search Report for corresponding Application No. PCT/JP2007/066612 dated Oct. 23, 2007.

Primary Examiner — Jeffrey A Burke
(74) Attorney, Agent, or Firm — Renner, Otto, Boisselle & Sklar, LLP

(57) ABSTRACT

There is provided an electronic device which presents manipulation guidance to a user as appropriate, depending on whether it is a function that the user can infer the manipulation method or substance of manipulation of.

An electronic device operating by switching between a plurality of types of manipulation targets includes: a storage section storing a database containing data of a guidance sentence concerning a switching manipulation for manipulation targets and guidance sentences concerning manipulations of executing functions of the respective manipulation targets; a detection section for detecting a switching of manipulation targets; a table generation section for generating a table based on the database in response to the detected switching of manipulation targets, such that the functions of the manipulation targets are classified in the table each into a common function for manipulation targets before and after a switching manipulation or a unique function; and a determination section for, if a function designated to be executed pertains to the common function, determining that a confirmation message concerning a switching of manipulation targets is to be presented, and if the function designated to be executed pertains to the unique function, determining that confirmation messages concerning the switching and the designated function are to be presented.

20 Claims, 22 Drawing Sheets

(56) References Cited

U.S. PATENT DOCUMENTS

| | | | |
|---|---|---|---|
| 6,549,143 B1 * | 4/2003 | O'Donnell et al. | 340/12.53 |
| 6,795,011 B1 * | 9/2004 | Berthoud et al. | 341/173 |
| 7,191,024 B2 * | 3/2007 | Kano et al. | 700/94 |
| 8,253,867 B2 * | 8/2012 | Hornback et al. | 348/734 |
| 2004/0019591 A1 | 1/2004 | Gardner | |
| 2007/0130607 A1 * | 6/2007 | Thissen et al. | 725/132 |
| 2007/0283389 A1 * | 12/2007 | Hallberg | 725/37 |

FOREIGN PATENT DOCUMENTS

| | | |
|---|---|---|
| JP | 2003-345486 | 12/2003 |
| JP | 2004-155410 | 6/2004 |
| JP | 2005-051310 | 2/2005 |
| JP | 2005-109746 | 4/2005 |

\* cited by examiner

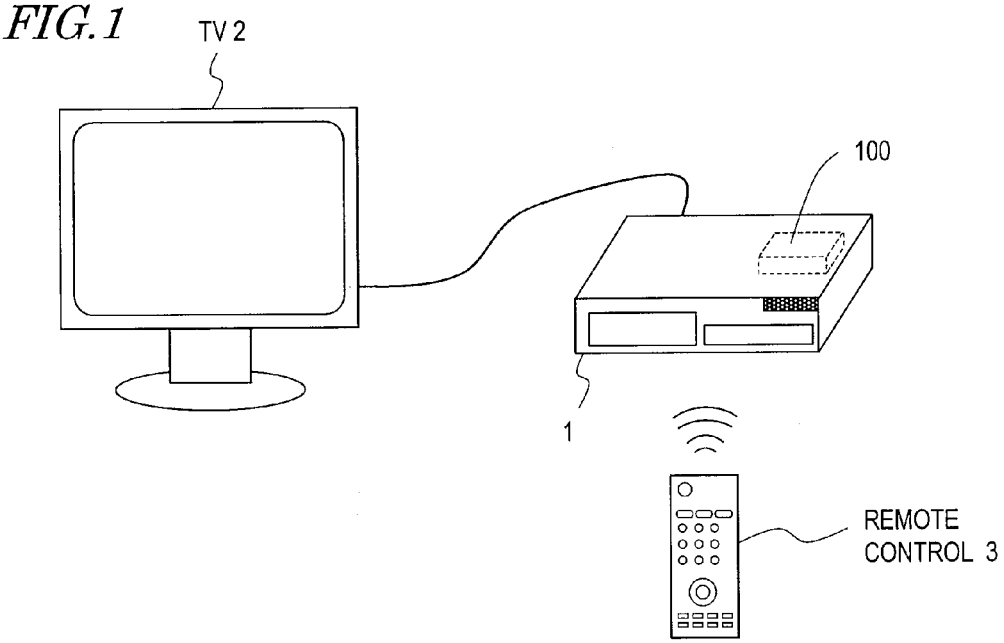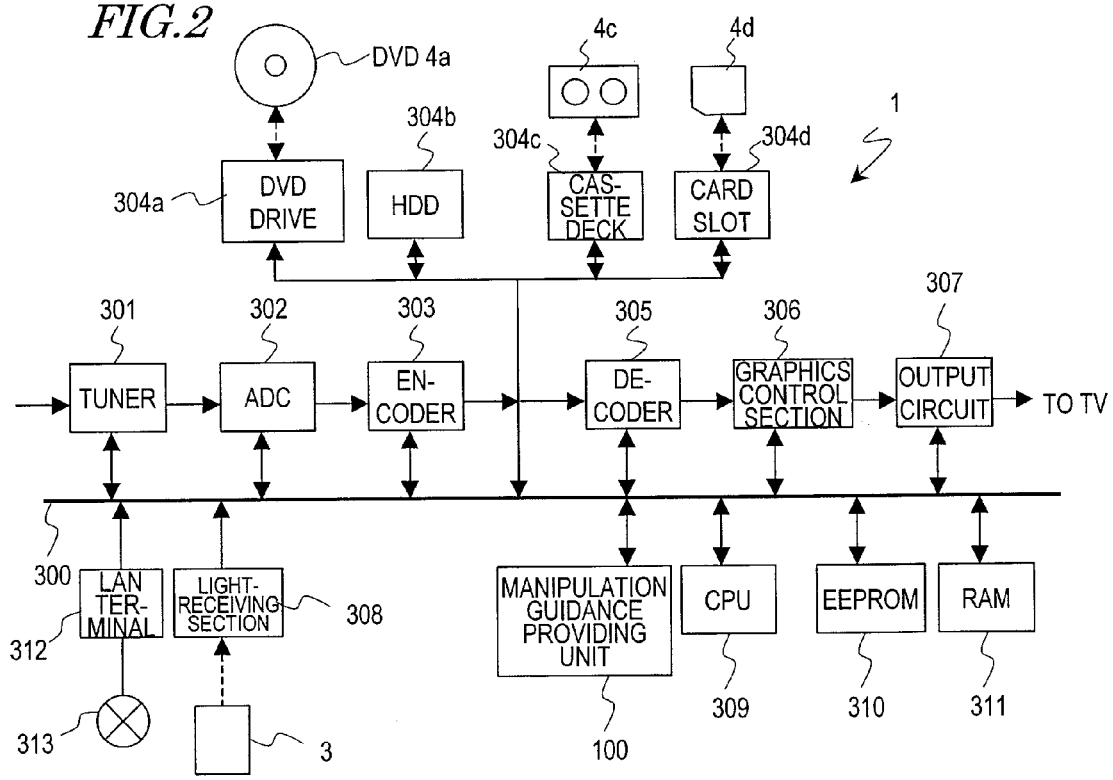

| | SWITCHING GUIDANCE | | | ... | FUNCTION GUIDANCE | | | ... |
|---|---|---|---|---|---|---|---|---|
| | VIDEO | DVD | HDD | | VIDEO | DVD | HDD | |
| | BY PRESSING "VIDEO" BUTTON... | BY PRESSING "DVD" BUTTON... | BY PRESSING "HDD" BUTTON... | | [PLAY] TO PLAY BACK... | [PLAY] TO PLAY BACK... | [PLAY] TO PLAY BACK... | |
| | | | | | [RECORD] TO RECORD... | [RECORD] TO RECORD... | [RECORD] TO RECORD... | |
| | | | | | [FAST-FORWARD] TO FAST-FORWARD... | [FAST-FORWARD] TO FAST-FORWARD... | [FAST-FORWARD] TO FAST-FORWARD... | |
| | | | | | | [SKIP] TO SKIP... | [SKIP] TO SKIP... | |
| | | | | | | [RECORDING LIST] BY PRESSING "PLAYBACK NAVI" BUTTON... | [RECORDING LIST] BY PRESSING "PLAYBACK NAVI" BUTTON... | |
| | | | | | | | [ERASE] TO ERASE... | |

| VIDEO | | | DVD | | | HDD | | |
|---|---|---|---|---|---|---|---|---|
| | SWITCHING FLAG | FUNCTION FLAG | | SWITCHING FLAG | FUNCTION FLAG | | SWITCHING FLAG | FUNCTION FLAG |
| [PLAY] | OFF | OFF | [PLAY] | OFF | OFF | [PLAY] | ON | OFF |
| [RECORD] | OFF | OFF | [RECORD] | OFF | OFF | [RECORD] | ON | OFF |
| [FAST-FORWARD] | OFF | OFF | [FAST-FORWARD] | OFF | OFF | [FAST-FORWARD] | ON | OFF |
| | | | [SKIP] | OFF | ON | [SKIP] | ON | ON |
| | | | [RECORDING LIST] | ON | ON | [RECORDING LIST] | ON | ON |
| | | | | | | [ERASE] | ON | ON |

FIG.10

| SWITCHING GUIDANCE | | FUNCTION GUIDANCE | |
|---|---|---|---|
| VIDEO | DVD | VIDEO | DVD |
| TO SWITCH TO VIDEO... | TO SWITCH TO DVD... | [PLAY] TO PLAY BACK... | [PLAY] TO PLAY BACK... |
| | | [RECORD] TO RECORD... | [RECORD] TO RECORD... |
| | | [FAST-FORWARD] TO FAST-FORWARD... | [FAST-FORWARD] TO FAST-FORWARD... |
| | | | [SKIP] TO SKIP... |
| | | | [RECORDING LIST] BY PRESSING "PLAYBACK NAVI" BUTTON... |

| | TERRESTRIAL ANALOG | | TERRESTRIAL DIGITAL | | | BS DIGITAL | | | CS DIGITAL | | |
|---|---|---|---|---|---|---|---|---|---|---|---|
| | SWITCH-ING FLAG | FUNC-TION FLAG | | SWITCH-ING FLAG | FUNC-TION FLAG | | SWITCH-ING FLAG | FUNC-TION FLAG | | SWITCH-ING FLAG | FUNC-TION FLAG |
| [CHANNEL] | ON | OFF | [CHANNEL] | ON | ON | [CHANNEL] | ON | ON | [CHANNEL] | ON | ON |
| [ENTER] | ON | OFF | [ENTER] | ON | ON | [ENTER] | ON | ON | [ENTER] | ON | ON |
| | | | [DATA BROAD-CAST] | ON | ON | [DATA BROAD-CAST] | ON | ON | [DATA BROAD-CAST] | ON | ON |
| | | | | | | | | | [PPV] | ON | ON |

81

| VIDEO | | DVD | | HDD | |
|---|---|---|---|---|---|
| FUNCTION | RATE OF CORRECT-NESS | FUNCTION | RATE OF CORRECT-NESS | FUNCTION | RATE OF CORRECT-NESS |
| [PLAY] | 0.9 | [PLAY] | 0.9 | [PLAY] | 0.8 |
| [RECORD] | 0.8 | [RECORD] | 0.7 | [RECORD] | 0.7 |
| [FAST-FORWARD] | 0.9 | [FAST-FORWARD] | 0.9 | [FAST-FORWARD] | 0.9 |
| | | [SKIP] | 0.5 | [SKIP] | 0.5 |
| | | [RECORDING LIST] | 0.3 | [RECORDING LIST] | 0.3 |
| | | | | [ERASE] | 0.6 |

*FIG.26*

| panasonic E95H | | | |
|---|---|---|---|
| | QUESTION | STATUS BEFORE MANIPULATION (E95H) | ANSWER (E95H) |
| Q1. | POWER ON TELEVISION SET. | TV SCREEN: off<br>DVD MACHINE: off | TV POWER |
| Q2. | SWITCH TELEVISION INPUT TO VIDEO 1. | TV SCREEN: on<br>DVD MACHINE: off | TV INPUT |
| Q3. | POWER ON DVD RECORDER. | TV SCREEN:VIDEO 1 SCREEN<br>DVD MACHINE: HDD MODE | DVD POWER |
| Q4. | DISPLAY CHANNEL 8. | TV SCREEN:VIDEO 1 SCREEN<br>DVD MACHINE:HDD MODE | 8 |
| Q5. | WORLD HERITAGE DVD-ROM IS ALREADY IN. PLAY THIS DVD-ROM. | TV SCREEN: 8ch<br>DVD MACHINE: HDD MODE | DVD ⇒ PLAY |
| Q6. | STOP. | TV SCREEN:WORLD HERITAGE BEING PLAYED BACK<br>DVD MACHINE:PLAYBACK DISPLAY | STOP |
| Q7. | DISPLAY CHANNEL 6. | TV SCREEN: DVD BACKGROUND<br>DVD MACHINE: DVD MODE | HDD<br>⇒6 |
| Q8. | RECORD CURRENTLY DISPLAYED PROGRAM TO HDD (HARD DISK). | TV SCREEN: :6ch<br>DVD MACHINE: HDD MODE | RECORD |
| Q9. | STOP RECORDING. | TV SCREEN: 6ch<br>DVD MACHINE:RECORDING LAMP ON | STOP |
| Q10. | DISPLAY LIST OF PROGRAMS RECORDED ON HDD (HARD DISK). | TV SCREEN: 6ch<br>DVD MACHINE: HDD MODE | PROGRAM NAVI |
| Q11. | SELECT BASEBALL FROM PROGRAM LIST. | TV SCREEN:PROGRAM NAVI<br>DVD MACHINE: HDD MODE | CURSOR<br>⇒SELECT BASEBALL |
| Q12. | PLAY BACK SELECTED BASEBALL PROGRAM. | TV SCREEN:PROGRAM NAVI<br>DVD MACHINE: HDD MODE | PLAY OR ENTER |
| Q13. | PLAY BACK NEXT CHAPTER. | TV SCREEN: PLAYBACK SCREEN<br>DVD MACHINE: HDD MODE | SKIP |
| Q14. | STOP. | TV SCREEN:PLAYBACK SCREEN<br>DVD MACHINE: HDD MODE | STOP |
| Q15. | SELECT VOLLEYBALL FROM PROGRAM LIST. | TV SCREEN:PROGRAM NAVI<br>DVD MACHINE: HDD MODE | CURSOR ⇒SELECT VOLLEYBALL |
| Q16. | SELECTED VOLLEYBALL PROGRAM IS TO BE ERASED. DISPLAY ERASE SCREEN. | TV SCREEN:PLAYBACK SCREEN<br>DVD MACHINE: HDD MODE | SUBMENU<br>⇒TITLE ERASE<br>⇒ENTER |
| Q17. | CANCEL PROGRAM ERASURE. | TV SCREEN:ERASE SCREEN<br>DVD MACHINE: HDD MODE | SELECT CANCEL<br>⇒ENTER |
| Q18. | RETURN TO TELEVISION SCREEN. | TV SCREEN:PROGRAM NAVI<br>DVD MACHINE: HDD MODE | PLAYBACK NAVI OR RETURN |

ANSWER SHEET (FOR E95H)
Q 1

NOT CONFIDENT　　　CONFIDENT
1　　2　　3　　4

| QUES-TION | FUNCTION | RATE OF CORRECT-NESS | PRESUMABLE CAUSE |
|---|---|---|---|
| Q5 | PLAY DVD | 0.5 | NUMBER OF STORAGE MEDIA |
| Q7 | SWITCH TO 6 ch | 0.3 | NUMBER OF STORAGE MEDIA |
| Q10 | RECORDING LIST | 0.4 | STORAGE MEDIUM TYPE |
| Q13 | NEXT CHAPTER | 0.6 | STORAGE MEDIUM TYPE |

ELECTRONIC APPARATUS HAVING OPERATION GUIDE PROVIDING FUNCTION

TECHNICAL FIELD

The present invention relates to a technique of manipulation assistance when hardware, e.g. a device, is manipulated by a user. More specifically, the present invention relates to a device that carries out an explanation of the substance of a hardware manipulation which a user intends to perform, the explanation being made in an adaptive manner to the user.

BACKGROUND ART

When a user uses a new device, it is a very effective form of manipulation assistance for the device to automatically provide guidance for the user concerning a method of manipulation for executing a function, or the substance of a manipulation for such a function, as a method of promoting the user's understanding of manipulations and preventing wrong manipulations.

As a general method for a device to provide manipulation guidance, a method is conceivable where, at the very first stage when a user uses a new device, the device explains manipulation methods for main functions or outlines of newly added functions. However, even if a manipulation method or an outline of a function is explained, the user may have forgotten it when actually performing the manipulation, so that the user may perform the manipulation without being sure. When a function is executed as a result of such a manipulation, the user himself or herself will need to refer to a manual or a help in order to know what function it is. Or, the user will have to learn the method of use or the substance of the function based on trial and error. This is a burden on the user.

On the other hand, according to a smart owner's manual described in Prior Art Document 1, the device not only retains its own system of manipulations but also the system(s) of manipulations of a device(s) that the user has been using so far. Thus, the device presents manipulation guidance for functions pertaining to any different system of manipulations. As a result, among the functions of a device which the user newly uses, manipulation guidance is automatically presented for new functions which did not exist in the device(s) which the user has so far been using.

Now, there is a strong tendency among various devices of the present day that they share common or similar functions. For example, devices such as video cassette recorders, DVD recorders, or personal computers all have the common function of recording television programs which are broadcast. While video cassette recorders and DVD players have a function of playing back contents such as movies, PCs and the like have a function of downloading contents in forms such as video-on-demand and playing back such contents. These can be regarded as similar functions.

Moreover, communication cards for PHS, mobile phones, and wireless LAN devices have a wireless communications function, such that the user is able to transmit or receive E-mail, browse on the WEB, etc., by utilizing that function. These can also be regarded as a common function or similar functions.

Furthermore, similar functions may also exist between a multi-purpose machine capable of recording or playback for plural types of storage media and a single-purpose device which performs recording or playback for only a single type of storage medium.

New functions of a device can be broadly classified into two. That is: (1) new functions which are similar to the functions of conventional devices so that the user can guess their manipulation methods or substance of manipulation; and (2) new functions which are different from the functions of conventional devices so that the user cannot guess their substance of manipulation or manipulation methods. In order to present manipulation guidance which is optimum for a new function, it is necessary to consider which one of (1) and (2) the new function falls under.

[Patent Document 1] Japanese Laid-Open Patent Publication No. 2004-155410

DISCLOSURE OF INVENTION

Problems to be Solved by the Invention

The device described in Patent Document 1 has a problem in that, since manipulation guidance is impartially output for any new function that does not belong to the device(s) which the user has so far been using, manipulation guidance will be presented even for those functions of which the user is able to infer the manipulation methods and substance of manipulation.

When such manipulation guidance is presented, the user will need to perform unnecessary manipulations for the manipulation guidance, e.g., a manipulation to clear the guidance screen. Moreover, if manipulation guidance is presented many times for functional manipulations which the user already knows, trust for any message that the device automatically may present will be lost. As a result, important messages or manipulation guidance may be overlooked, thus leading to a possibility that some serious manipulation mistake may be induced, e.g., deleting a recorded content by mistake.

An objective of the present invention is to present manipulation guidance to a user as appropriate, depending on whether it is a function that the user can infer the manipulation method or substance of manipulation of.

Means for Solving the Problems

An electronic device according to the present invention operates by switching between a plurality of types of manipulation targets. The electronic device comprises: a storage section storing a database containing data of a guidance sentence concerning a switching manipulation for manipulation targets and data of guidance sentences concerning manipulations of executing functions assigned to the respective manipulation targets; a detection section for detecting a switching of manipulation targets; a table generation section for generating a table based on the database in response to the detected switching of manipulation targets, such that the functions of the manipulation targets are classified in the table each into a common function to be executed commonly for manipulation targets before and after a switching manipulation or a unique function not to be executed commonly; a determination section for, if a function designated by a user to be executed pertains to the common function, determining that a confirmation message concerning a switching of manipulation targets is to be presented, and if a function designated by a user to be executed pertains to the unique function, determining that the confirmation message and a confirmation message concerning the designated function are to be presented; and an output section for outputting a presentation signal for presenting the confirmation message.

The plurality of types of manipulation targets may be a plurality of types of storage media.

The electronic device may further comprise a terminal for transmitting a request signal onto a network and receiving an answer signal to the request signal, wherein, the plurality of types of manipulation targets may be a plurality of servers providing different services, each of the plurality of servers being capable of receiving the request signal via the network and transmitting an answer signal for providing a service in accordance with the request signal.

The plurality of types of manipulation targets may be a plurality of types of tuners each capable of receiving a broadcast signal of a different broadcasting system.

The detection section may detect a change in at least one of a number and type of manipulation targets as a change in the manipulation targets.

Each storage medium may be removable; the detection section may detect a change from a state where no storage medium is loaded to a state where one storage medium is loaded; and the table generation section may generate a table in which a function to be executed by using the loaded storage medium is classified into a predetermined one of the common function and the unique function.

The table generation section may generate a table in which a switching flag indicating whether or not to present the confirmation message concerning the switching and a function flag indicating whether or not to present the confirmation message concerning the function are set for each function.

For any function pertaining to the common function, the table generation section may set a switching flag indicating that the confirmation message concerning the switching is to be presented, and set a function flag indicating that the confirmation message concerning the function is not to be presented.

For any function pertaining to the unique function, the table generation section may set a switching flag indicating that the confirmation message concerning the switching is to be presented, and set a function flag indicating that the confirmation message concerning the function is to be presented.

The determination section may determine based on the switching flag that the confirmation message concerning the switching is to be presented, and determine based on the function flag that the confirmation message concerning the function is to be presented.

The electronic device may further comprise an update section for updating the table, wherein, after presenting the confirmation message concerning the switching or the confirmation message concerning the function, the update section ma change the corresponding switching flag or function flag so as to indicate that the confirmation message is not to be presented.

When an instruction to cancel the message is received after presenting the confirmation message, the update section may change the corresponding switching flag or function flag so as to indicate that the confirmation message is not to be presented.

When an elapsed time since the confirmation message is presented and until a response from the user is received is equal to or less than a predetermined time, the update section may change the corresponding switching flag or function flag so as to indicate that the confirmation message is not to be presented.

The update section may retain a number of times of presenting the confirmation message, and when the number of times of presenting is equal to or greater than a predetermined number of times, the update section change the corresponding switching flag or function flag so as to indicate that the confirmation message is not to be presented.

The storage section may further store a rate-of-correctness database in which a plurality of functions for which to output confirmation messages and a rate of correctness for each of the plurality of functions are associated; and the update section may refer to the rate-of-correctness database to acquire a rate of correctness corresponding to a function subjected to an update for indicating that the confirmation message is not to be presented, and among the plurality of functions defined in the rate-of-correctness database, for any function associated with a rate of correctness equal to or greater than the acquired rate of correctness, change the corresponding function flag so as to indicate that the confirmation message is not to be presented.

Each of the plurality of functions may be classified according to the type of storage medium used; and among the plurality of functions defined in the rate-of-correctness database, for any function which belongs to the same classification as the function subjected to an update for indicating that the confirmation message is not to be presented and which is associated with a rate of correctness equal to or greater than the acquired rate of correctness, the update section may change the corresponding function flag so as to indicate that the confirmation message is not to be presented.

The update section may retain a predetermined threshold value concerning rates of correctness, and among the plurality of functions defined in the rate-of-correctness database, for any function associated with a rate of correctness which is equal to or greater than the acquired rate of correctness and which is greater than the threshold value, change the corresponding function flag so as to indicate that the confirmation message is not to be presented.

Among the plurality of functions defined in the rate-of-correctness database, for any function associated with a rate of correctness equal to or less than the threshold value, the update section may change the corresponding function flag so as to indicate that the confirmation message is to be presented at least once.

An apparatus is used in an electronic device operating by switching between a plurality of types of manipulation targets. The apparatus comprises: a storage section storing a database containing data of a guidance sentence concerning a switching manipulation for manipulation targets and data of guidance sentences concerning manipulations of executing functions assigned to the respective manipulation targets; a detection section for detecting a switching of manipulation targets; a table generation section for generating a table based on the database in response to the detected switching of manipulation targets, such that the functions of the manipulation targets are classified in the table each into a common function to be executed commonly for manipulation targets before and after a switching manipulation or a unique function not to be executed commonly; a determination section for, if a function designated by a user to be executed pertains to the common function, determining that a confirmation message concerning a switching of manipulation targets is to be presented, and if a function designated by a user to be executed pertains to the unique function, determining that the confirmation message and a confirmation message concerning the designated function are to be presented; and an output section for outputting a presentation signal for presenting the confirmation message or messages.

EFFECTS OF THE INVENTION

According to the present invention, when the manipulation target is switched during use of a device having a plurality of switchable manipulation targets (e.g., a plurality of storage media, servers at a plurality of connection destinations, a plurality of broadcast tuners), if a function designated by a user to be executed is a common function which is to be executed commonly for the manipulation targets before and after the switching, a confirmation message concerning switching of manipulation targets is presented. On the other hand, if a function designated by the user to be executed is a unique function which is not to be executed commonly for the manipulation targets before and after the switching, a confirmation message concerning switching and a confirmation message concerning the designated function are presented.

Even if it is a new function emerging at the addition of a new storage medium, no unnecessary manipulation guidance is provided for any common function of which the user is able to infer the manipulation, so that manipulation guidance is only output for unique functions of which the manipulation methods or substance of manipulations is unknown. As a result, it is possible to reduce manipulations against unnecessary guidance, thus reducing the user's burden of manipulation. Moreover, since guidance is provided only for functions of which the substance of manipulations is unknown, trust for the messages presented by the device is promoted, thus preventing serious manipulation mistakes from overlooking messages.

By detecting switching of manipulation targets based on a change in the number and type of storage media and determining whether or not to output manipulation guidance, for example, even if it is a new function, emerging at the addition of a new storage medium, of that storage medium, no unnecessary manipulation guidance is provided for any common function of which the user is able to infer the manipulation, so that manipulation guidance is only output for unique functions of which the manipulation methods or substance of manipulations is unknown.

Moreover, by performing updates of the manipulation guidance output table based on the number of times of outputting manipulation guidance with respect to a function and on a result of manipulation for the manipulation guidance screen, it becomes possible to output manipulation guidance only for necessary manipulations, while no longer providing unnecessary manipulation guidance for manipulations which have already been learned by the user.

BRIEF DESCRIPTION OF DRAWINGS

FIG. 1 A diagram showing the constitution of an environment in which a DVD recorder 1 with an internal HDD is used.

FIG. 2 A diagram showing a hardware construction of the recorder 1.

FIG. 4 A diagram showing the data structure of a manipulation guidance DB 39.

FIG. 10 A diagram showing changes in the manipulation guidance output table and an output instance of manipulation guidance corresponding to a user's actions.

FIG. 15 A diagram showing a manipulation guidance output table 81 according to Embodiment 3.

FIG. 26 A diagram showing an example of a question paper with an answer key, used by an examinee for learning.

Figure 3:
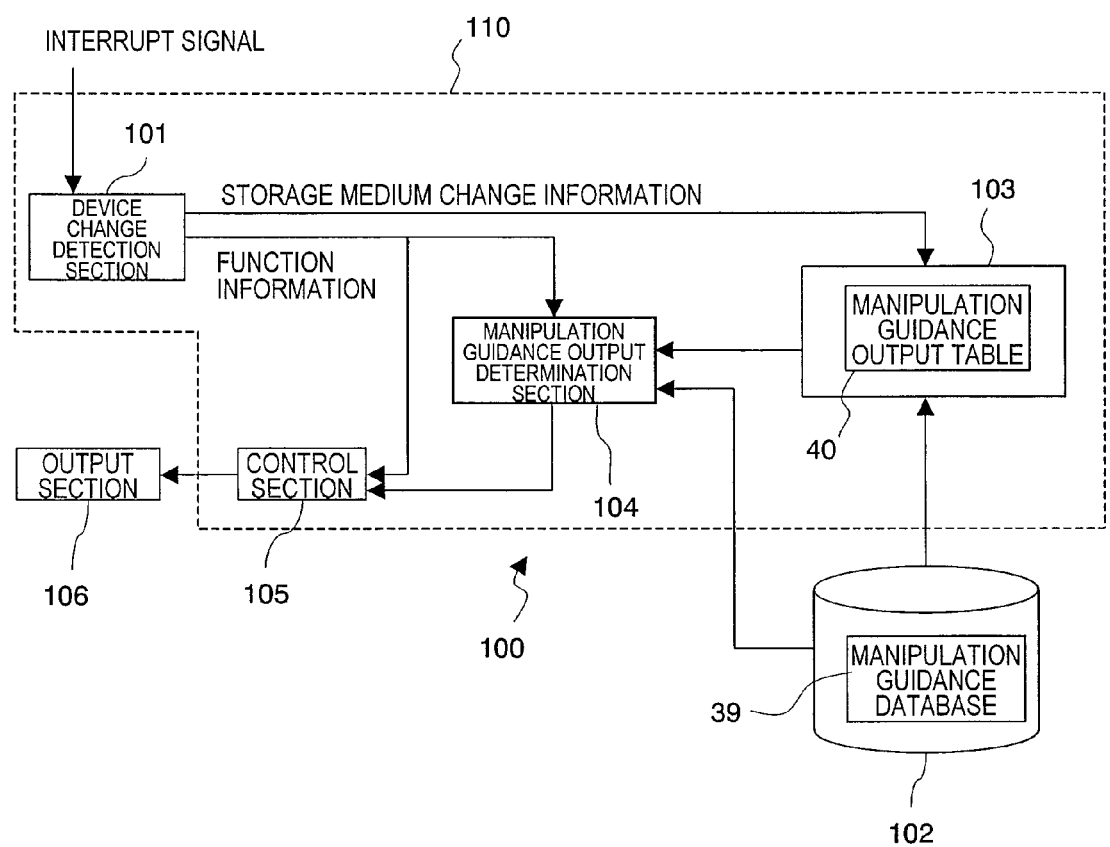
FIG. 3 A diagram showing the functional block construction of a guidance providing unit 100 according to Embodiment 1.

DESCRIPTION OF THE REFERENCE NUMERALS 39 manipulation guidance database
40 manipulation guidance output table
101 device change detection section
102 database storage section
103 table generation section
104 manipulation guidance output determination section
105 control section
106 output section
110 CPU

BEST MODE FOR CARRYING OUT THE INVENTION

When using a device on which a plurality of types of storage media are usable, e.g., a DVD recorder in which a hard disk drive (HDD) is internalized, it is necessary to switch the manipulation target to the HDD or the DVD before executing a recording function or a playback function.

However, by using a DVD recorder with an internal HDD, the inventors have conducted a manipulation experiment to find out that an examinee may forget to perform a manipulation of switching the manipulation target, in which case the manipulations intended by themselves are not obtained.

The inventors have analyzed the reason why an examinee may have forgotten to perform a switching manipulation, thus arriving at the inference that: (1) although the examinee attempted to execute a function which is commonly executable to the manipulation targets before and after the switching manipulation, the examinee has forgotten about the switching manipulation because of an increased number of storage media to serve as the manipulation target; or (2) the examinee attempted to execute a function which is unique to the storage medium after the switching manipulation (i.e., a function which does not pertain to the storage medium having been manipulated so far), but was not sure as to what sort of manipulation should be performed, until eventually forgetting about the switching manipulation itself. Based on this inference, usability for the user will increase very much if manipulation guidance (a help) is presented to the user in situations where the switching manipulation is likely to be forgotten. Moreover, it will make for an improved convenience of the user to present a help also in situations where one is not sure as to what sort of manipulations should be performed.

Accordingly, the inventors have developed a device which presents such manipulation guidance, as well as an apparatus therefor. Hereinafter, with reference to the attached drawings, embodiments of the electronic device and manipulation guidance providing apparatus according to the present invention will be described.

First, with reference to FIG. 24 to FIG. 28, the manipulation experiment which has been performed by the inventors using a DVD recorder will be described. This manipulation experiment was performed in order to investigate into the causes as to why a user may perform the wrong manipulation when a device has a plurality of storage media. Thereafter, with reference to FIG. 1 to FIG. 23, embodiments of the present invention will be described.

1. OUTLINE OF DVD RECORDER MANIPULATION EXPERIMENT

In this experiment, under a condition where manipulation learning for different devices had been performed in advance, functions that are susceptible to wrong manipulations were observed as well as causes for the wrong manipulations, regarding remote control manipulations for a DVD recorder as an evaluation subject. The manipulation learning was performed in order to set the advance manipulation knowledge possessed by the examinees to different conditions.

The examinees were divided into a group who learned manipulations of the functions of the DVD recorder and a group who did not do such learning. The group who did the learning learned in advance the device manipulations of one model among four DVD recorders which had been previously prepared, and took a manipulation test of 20 questions using the other three models. On the other hand, the group who did not do the learning did not learn about any of the models, but took a manipulation test of 20 questions for the four DVD recorders, similarly to the group who did the learning.

It was confirmed through the manipulation test that, against a familiar DVD recorder, when a DVD recorder which embodies a change in the type of storage medium that can be used within a single machine is used, for example, wrong manipulations are likely to occur with respect to the manipulations of new functions related to the storage medium that has emerged from the change. This result has led to the finding that, when a user newly uses a device in which a plurality of storage media are usable, manipulation explanations may be performed by paying attention to the change in the type of storage medium. It was further confirmed that wrong manipulations are also likely to occur when the number of storage media to be manipulated has increased.

More specifically, it was confirmed that wrong manipulations which occur due to a differing number of storage media are ascribable to lack of manipulation knowledge on the switching of storage media, and that wrong manipulations which occur due to a differing type of storage medium are ascribable to lack of manipulation knowledge on the new functions which are unique to the storage medium. This has led to the novel finding that: when the number of storage media changes, knowledge on the switching manipulation for storage media may be explained, and when the type of manipulable storage medium has changed, an explanation of not only the switching manipulation for storage media but also any new function associated with the type of storage medium may be performed, thus making it possible to omit the explanations of manipulations which are predictable to the user and yet provide functional explanations on the new functions for the user.

Note that one type of storage medium may be inserted in plurality within a single DVD recorder, e.g., in the case where two switchably-used hard disks are provided in a single recorder. When taking such cases into consideration, it is necessary to distinguish between the number and type of storage media.

2. Details of Dvd Recorder Manipulation Experiment

The purpose of this experiment is to, regarding new functions that are susceptible to wrong manipulations, extract the common manipulation knowledge that serves as a cause of the wrong manipulations.

To conduct the experiment, 15 examinees, who were college students, were provided with four DVD recorders differing in their systems of manipulation as well as remote controls, GUIs, device indication interfaces, and the like. The four were: DMR-EH60 (Panasonic), DMR-E95H (Panasonic), PSX DESR-7700 (Sony), and RD-XS43 (Toshiba). All examinees were accustomed to the manipulation of videorecorders. None of the examinees owned DVD recorders, and did not know any specific manipulation methods of DVD recorders in the beginning.

Figure 24:
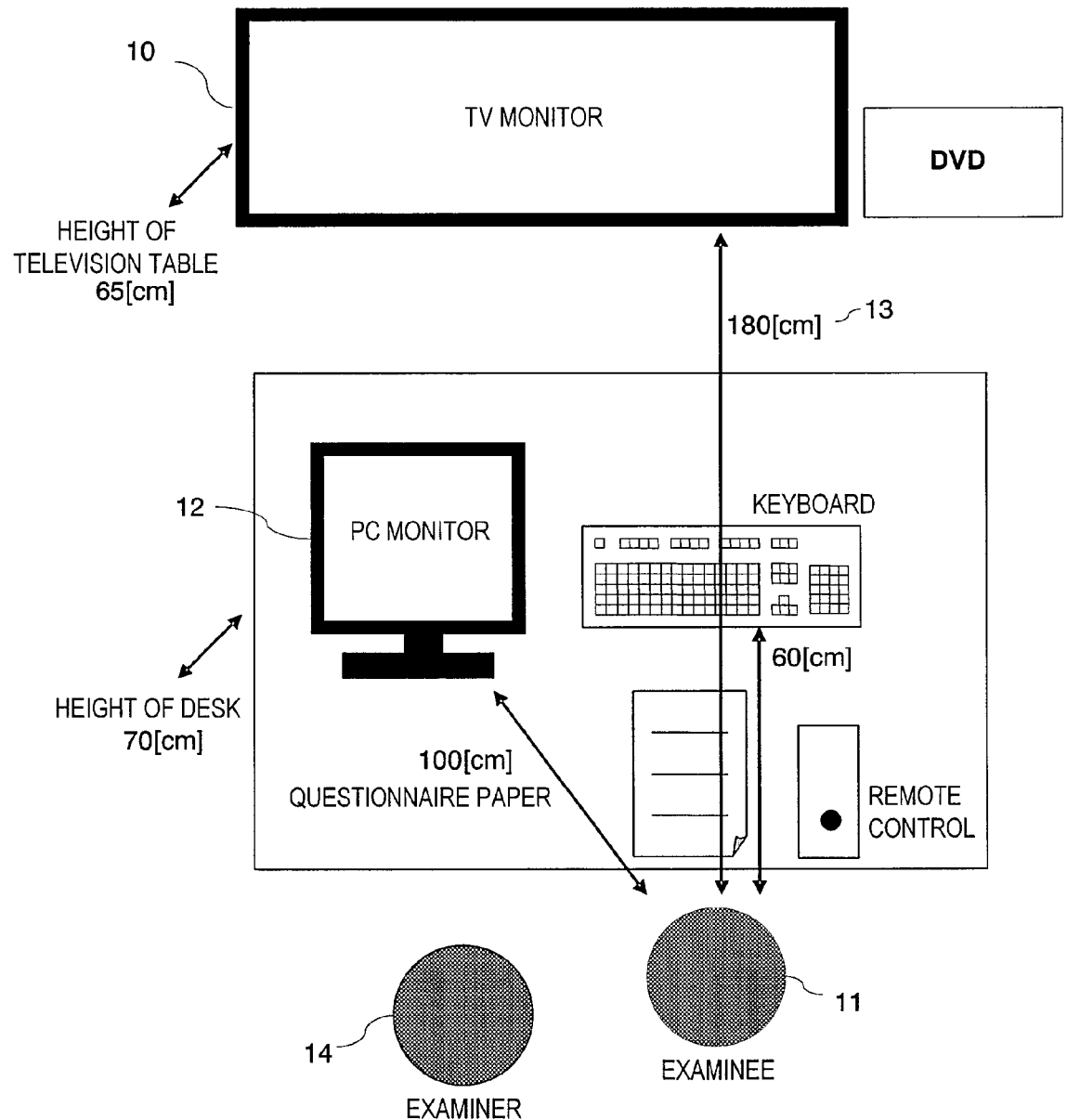
FIG. 24 A diagram showing positioning of experimental equipment.

FIG. 24 shows positioning of experimental equipment. A television set 10 is TH-36DH200 (Panasonic). The television set 10 is provided in order to display manipulation results of the remote control. A PC monitor 12 is a Flex Scan L685 17-inch liquid crystal display (EIZO). The PC monitor 12 is provided in order to present test questions to an examinee 11.

A distance 13 between the examinee 11 and the television screen 10 was 180 cm, which was decided as the natural distance for usually watching television at home. Moreover, in order to present questions to the examinee 11 and to conduct device manipulations, an examiner 14 was on stand-by behind the examinee 11.

Figure 25:
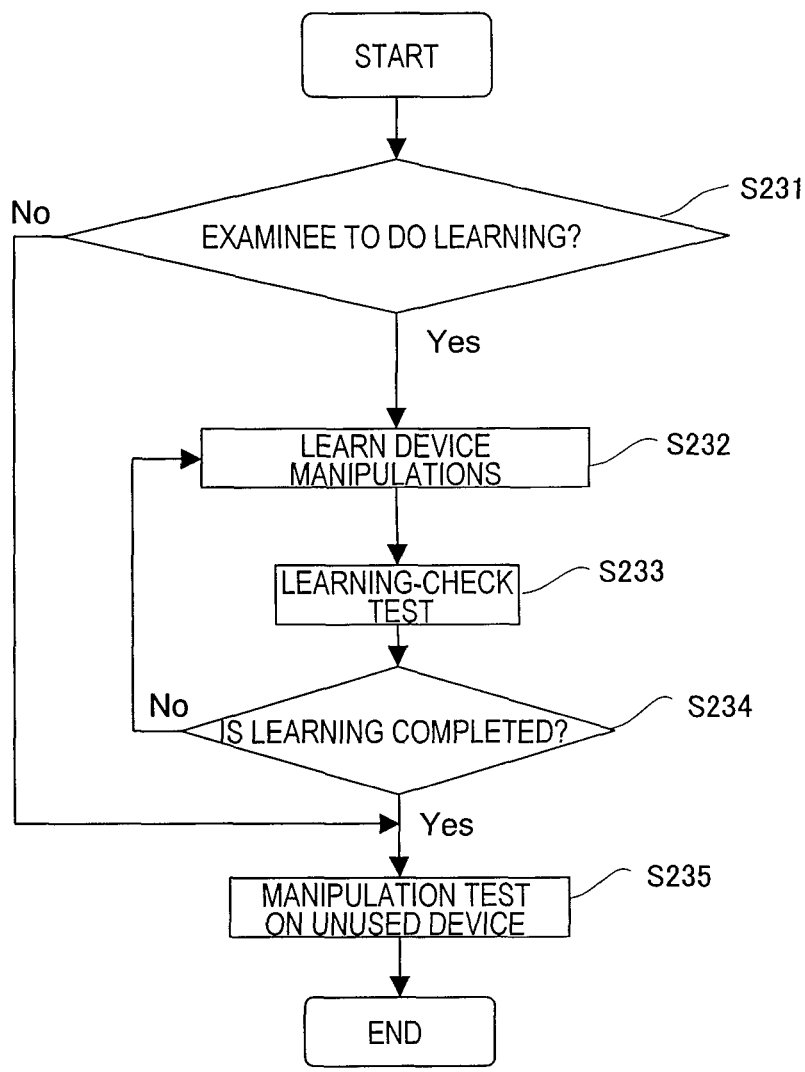
FIG. 25 A flowchart showing a procedure of a manipulation experiment.

FIG. 25 shows a procedure of the manipulation experiment. At step S231, a determination is made between an examinee who is to do learning and an examinee who is not to do learning. In this experiment, 12 out of the 15 examinees were permitted learning, whereas the other 3 examinees were not permitted learning.

At step S232, an examinee who was determined at step S231 to do learning was allowed to learn the manipulations of one DVD machine. The manipulation learning was performed in order to set the advance manipulation knowledge possessed by the examinees to different conditions. The twelve were divided into 4 groups each consisting of three, and each group was allowed to learn about either one of DMR-EH60, DMR-E95H, PSX DESR-7700, or RD-XS43.

FIG. 26 shows an example of a question paper with an answer key, used by the examinee for learning. The question paper describes, in executing the substance of each question, what kind of result defines a correct answer with respect to what kind of status before manipulation. As the learning method, a method was used where the question paper with an answer key shown in FIG. 26 was given to the examinee, and the examinee was allowed to freely do learning while actually performing remote control manipulations for the DVD recorder. The learning time was 20 minutes.

At step S233, a learning-check test was performed for the examinees who did learning at step S232. As the test method, a method was used where: the same questions as those used for the learning at step S232 were consecutively output on the PC monitor 12 shown in FIG. 24; the examinee would press a button on the remote control in response to each question; and the result of correctness or incorrectness of the press manipulation was recorded by the examiner.

At step S234, it was determined whether those examinees who did learning at step S233 had completed learning. As the determination method, completion of learning was determined when the results of the learning-check test performed at step S233 were all correct. On the other hand, if not all of the results of the learning-check test were correct, incompletion of learning was determined, and control returned to step S232 to allow a second chance of learning.

At step S235, a manipulation test of evaluation subject devices was conducted for those examinees whose learning was determined to have been completed at step S234, and those examinees who were determined at step S231 not to do learning. For any examinee whose learning was determined to have been completed at step S234, a manipulation test was performed by using as the evaluation subject devices the three other DVD recorders that were not used for the learning. For any examinee who was determined at step S231 not to do learning, a manipulation test was performed by using all of the four devices as the evaluation subject devices. As the manipulation test, the same questions as the questions used at step S233 were used.

Figures 27, 28:
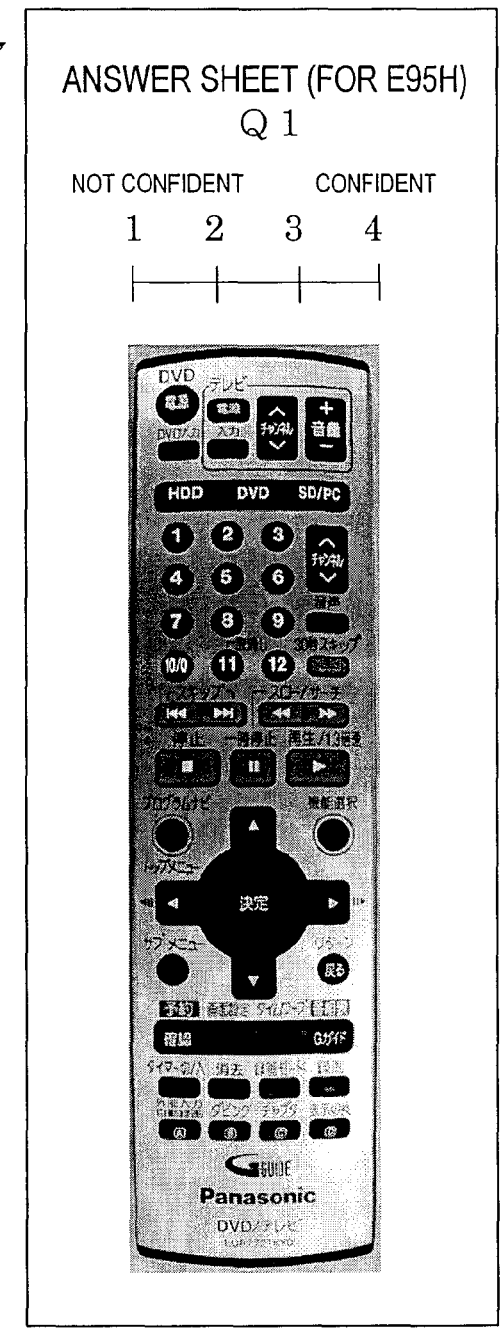
FIG. 27 A diagram showing an example of an answer sheet.
FIG. 28 A diagram showing exemplary experimental results.

FIG. 27 shows an example of an answer sheet. As the answering method, a method was used where, after each question was displayed on the PC monitor 12, a certainty level regarding the answer to that question was first written down, and thereafter the examinee made a sign around the remote control button on the answer sheet that was believed to be correct. Since the examinee would write the answer on paper, instead of actually performing a remote control manipulation, the responses of the device based on the manipulation results would not be known to the examinee. Thus, it was ensured that the manipulation knowledge regarding the evaluation subject device would not change because of the responses of the device responsive to the user's device manipulations, thus allowing each question on each model to be evaluated in direct comparison based solely upon differences in the conditions of learning in advance.

FIG. 28 shows exemplary experimental results according to the above procedure. FIG. 28 shows results of rates of correctness on manipulations when using E95H, as well as presumable causes of wrong manipulations, with respect to specific questions (Q5, 7, 10, 13). As used herein, a "rate of correctness" is a value corresponding to the number of those who have correctly answered, prescribed to be 1.0 when all examinees have answered correctly and to approach zero as the number of correctly-answered examinees decreases. Q5 is a question as to, when a device capable of switching between an HDD mode and a DVD mode is in the HDD mode before the examinee performs a manipulation, a method of playing back a DVD which is already inserted. Half of the examinees performed the wrong manipulation with respect to this question. As an analytical reason therefor, it is inferred that the examinees pressed a play button on the remote control without switching to the DVD mode, although the device was in the HDD mode. In other words, it is inferred that the examinees knew the existence of a playback function which is common to DVD and HDD, but forgot to switch the mode manipulation.

Similarly, as for Q7 (which says display 6 ch of the HDD in a state where a DVD is being played back), more than half of the examinees performed the wrong manipulation. It is inferred that this is because, despite the examinees' thought that 6 ch would be displayed if the 6 ch button on the remote control was pressed, they pressed the 6 ch button on the remote control in a state where a DVD was actually being played back, thus switching to chapter 6. In other words, the cause for the wrong manipulation of the examinees for Q7 is also inferred to be because the examinees had forgotten about mode switching or was not sure about the switching method.

In all of the aforementioned cases, it is inferred that the examinees recognized that the HDD and the DVD were existing as manipulation target storage media, but that they failed to switch the manipulation target storage media because the target of manipulation had changed from DVD only to both DVD and HDD, i.e., the number of manipulation target had changed, thus resulting in the wrong manipulation.

On the other hand, Q10 and Q13 are questions of a different character from that of Q5 and Q7.

Q10 is a question of displaying a list of programs that are recorded on the HDD. As for this question, it can be inferred that those examinees who had never used functions related to HDD and DVD, i.e., those examinees who had only used videotape functions, were not sure as to what to do in the face of the new function to be tried for the first time, and thus performed wrong manipulations. Similarly in Q13, it can be inferred that it was a new function to be tried for the first time to those examinees who had never used HDD or DVD, and thus they performed wrong manipulations, resulting in a decrease in the rate of correctness.

Thus, the following findings are derived from the results of this experiment.

(1) When the number of manipulable storage media has changed, it is preferable to present a help concerning a method of switching manipulation for storage media.

(2) When the type of manipulable storage medium has changed, it is preferable to present a help concerning a function which is not to be executed commonly for the storage media before and after the switching manipulation (a unique function to that storage medium). Stated otherwise, there is no need to present any help concerning a function (common function) which is to be executed commonly for the respective storage media. Furthermore, it is preferable to present a help in response to a change in the type of storage medium. The reason is that a change in the type of storage medium amounts also to a change in the number of storage media.

The above findings are also applicable to other than storage media, so long as they are manipulation targets which require switching. Such manipulation targets are, for example, an analog tuner, a tuner which supports different broadcasting systems (e.g., a digital tuner), and a server at a service provider who provides different information providing services via a network.

The finding of (1) above is applicable to the case where the number of tuners or the number of servers has changed. On the other hand, when the type of tuner or the type of server has changed, the finding of (2) above is considered applicable. As a result, it becomes possible to output manipulation guidance only for unsure functions, without providing any unwanted guidance concerning functions of which the user is able to infer the manipulation method for the manipulation target or the substance of the function.

Note that changes in the number and type of manipulation targets such as storage media, tuners, or servers all occur upon switching between manipulation targets. Therefore, in the present specification, it is assumed that the term "switching" encompasses both a change in the number of manipulation targets and a change in the type of manipulation target.

Next, the specific construction and operation of a manipulation guidance providing apparatus which operates according to the aforementioned findings and an electronic device having such an apparatus will be described.

3. DESCRIPTION OF EMBODIMENTS OF THE PRESENT INVENTION

First, with reference to FIG. 1 and FIG. 2, a device environment in which the manipulation guidance providing apparatus according to the present invention and the electronic device having the manipulation guidance providing apparatus will be described. In the following description, it is assumed that the electronic device is a DVD recorder with an internal HDD.

FIG. 1 shows the constitution of an environment in which a DVD recorder 1 with an internal HDD is used.

The DVD recorder 1 with an internal HDD (hereinafter referred to as the "recorder 1") has a function of recording a broadcast program on a storage medium such as a DVD/a hard disk/a magnetic tape/a memory card (none of them is shown), and reproducing a broadcast program recorded thereon. On a remote control 3, the user is able to perform switching as to which storage medium a program is to be recorded onto or from which storage medium a program is to be played back. The switching also occurs as the user mounts a storage medium.

Since various manipulations are to be performed for each of a plurality of types of storage media as a target, these will be referred to as manipulation targets in the present specification.

Note that the user utilizes a remote control 3 and buttons on the main housing (not shown) to manipulate the recorder 1, thus being able to execute further other functions of the recorder 1. Execution of other functions will be described as Embodiments 2 and 3 of the present invention.

The recorder 1 has a manipulation guidance providing unit 100 internalized therein. The manipulation guidance providing unit 100 (hereinafter referred to as the "guidance providing unit 100") has a function of presenting to the user a help concerning a manipulation of executing a function assigned to each manipulation target. For example, it is a function of displaying, on a screen, manipulation explanation guidance as to how switching of the manipulation target may be made, or outputting a manipulation explanation in audio. Details such as the condition and timing for the guidance providing unit 100 to present a help and substance of the help will be specifically described later.

FIG. 2 shows a hardware construction of the recorder 1. The recorder 1 is capable of writing or reading arbitrary data to or from a storage medium such as a DVD 4a/a hard disk/a video cassette 4c/a memory card 4d. Note that the DVD 4a may be a read-only disk, in which case the recorder 1 only performs data read.

In the present specification, a "storage medium" is defined as a medium for recording data or signals such as audio, images, video, or text. Examples of types of storage media are optical disks such as DVDs and CDs, memory cards such as SD cards, magnetic disks such as hard disks and flexible disks, magneto-optical disks such as MOs, and magnetic tape such as videotape.

The recorder 1 includes a bus 300, a tuner 301, an AD converter 302, an encoder 303, a DVD drive 304a, hard disk drive (HDD) 304b, cassette deck 304c, card slot 304d, a decoder 305, a graphics control section 306, an output circuit 307, a light-receiving section 308, a CPU 309, an EEPROM 310, an RAM 311, a LAN terminal 312, and a guidance providing unit 100.

Hereinafter, the functions of the respective component elements will be described. The bus 300 is a signal line. The bus 300 connects between the other component elements of the recorder 1 to transmit signals within the recorder 1.

The tuner 301 receives e.g. analog broadcast wave signals from an antenna (not shown), and extracts a signal of a necessary program by performing a tuning based on frequency. The AD converter 302 subjects the signal from the tuner 301 to digital conversion, and supplies it to the encoder 303. Upon receiving an instruction to start recording, the encoder 303 subjects the supplied digital data to compression encoding in MPEG-2 format, for example, and outputs it as encoded data.

The DVD drive 304 includes a disk tray, an optical head, a spindle motor, a rotation axis for transmitting the rotation of the spindle motor to a disk, a controller for controlling the operation of the entire drive, and the like (none of which is shown). Upon receiving an instruction to start recording, the DVD drive 304 optically writes the encoded data to the DVD 4a. Upon receiving an instruction to start playback, the DVD drive 304 optically reads the data that is written to the DVD 4a.

The HDD 304b includes a magnetic disk, a head, a spindle motor, a rotation axis for transmitting the rotation of the spindle motor to a disk, a controller for controlling the operation of the entire drive, and the like (none of which is shown). The HDD 304b magnetically writes data to the hard disk, and magnetically reads data from the hard disk.

The cassette deck 304c includes a take-up motor for a reel, a head drum having a rotating magnetic head, and the like. The cassette deck 304c magnetically records a signal to the video cassette 4c, and magnetically reproduces a signal from the video cassette 4c.

The card slot 304d includes a slot in which a semiconductor memory card such as an SD memory card is inserted and data terminals which come in contact with terminals of the memory card for data exchange. The card slot 304d electrically writes data to the memory card, and electrically reads data from the memory card.

Upon receiving an instruction to start playback, the decoder 305 expands the data that has been read by the DVD drive 304, the HDD 304b, or the card slot 304d, converts it to a digital signal of video or audio uncompressed data, and supplies it to the graphics control section 306. Note that, without being supplied to the decoder 305, a signal which is output from the cassette deck 304c may be sent to the graphics control section 306 via the bus 300.

The graphics control section 306 superposes video data from within an internal memory (not shown) onto uncompressed video data, thus realizing an On Screen Display (OSD) function. Moreover, based on the received manipulation confirmation information, the graphics control section 306 outputs image signals for displaying predetermined confirmation messages and screens. For example, when a user has pressed a predetermined button, the graphics control section 306 may output a video signal that contains a manipulation explanation, or an image signal (digital baseband signal) in which a varying menu image and video are merged. The output circuit 307 subjects the input digital image signal/ audio signal to analog conversion for output. The output destination may be the TV 2, for example.

The light-receiving section 308 receives infrared light from the remote control 3, and sends an instruction based on the user's manipulation, e.g., an instruction to start/stop recording, or start/stop playback of a recorded program, to the CPU 309 and the guidance providing unit 100 via the bus 300.

The CPU 309 is a central control unit which controls the overall operation of the recorder 1. By utilizing the EEPROM 310 and the RAM 311, the CPU 309 controls the overall process including signal flows within the recorder 1. By reading and executing a program stored in the EEPROM 310, the CPU 309 generates control signals for realizing a process based on the program, and outputs them to the respective component elements via the CPU bus 300.

The EEPROM 310 is a non-volatile memory which is electrically rewritable, and stores software programs for controlling the recorder 1. Various flowcharts included in the attached drawings and concerning the descriptions of the embodiments are each implemented as a software program. Note that the EEPROM 310 may store software programs to be executed by a CPU (described later) in the guidance providing unit 100 described later.

The RAM 311 has a work area for storing data which is necessary for the CPU 309 to execute programs. For example, by using the CPU bus 300, the CPU 309 reads a program from the EEPROM 310 into the RAM 311, and executes the program.

Note that computer programs are distributed on the market in recorded forms on storage media such as CD-ROMs, or transmitted via telecommunication lines such as the Internet. Thus, a computer system which is constructed by using a PC or the like may be allowed to operate as an electronic device having functions similar to those of the recorder 1 of the present embodiment, or operate as an apparatus having functions similar to those of the guidance providing unit 100.

The LAN terminal 312 is used for connecting the recorder 1 to a data communications network 313 such as the Internet. For example, the LAN terminal 312 is a terminal under the ETHERNET (registered trademark) standard.

The guidance providing unit 100 is implemented as a board on which one integrated circuit or a plurality of integrated circuits are mounted. The following descriptions assume that the guidance providing unit 100 is implemented as a board on which one integrated circuit is mounted.

Hereinafter, an embodiment of the guidance providing unit 100 of the present invention when implemented in the recorder 1 will be described.
(Embodiment 1)
Description of the Overall Construction of the Guidance Providing Unit 100:

FIG. 3 shows the functional block construction of the guidance providing unit 100 according to the present embodiment. The guidance providing unit 100 includes a database storage section 102, an output section 106, and a CPU 110.

The CPU 110 controls the operation of the guidance providing unit 100. Although the following descriptions assume that the CPU 110 is a separate integrated circuit from the CPU 309 of the recorder 1, this is only exemplary. As the CPU 309 of the recorder 1 executes the computer program in the place of the CPU 110, each function of the CPU 110 described later can be realized by using the CPU 309 alone. In this case, the guidance providing unit 100 is implemented in software. There is no need for any individual board, circuitry, or other hardware for the guidance providing unit 100.

The CPU 110 includes a device change detection section 101, a table generation section 103, a manipulation guidance output determination section 104, and a control section 105. This means that, when regarded functionally, the CPU 110 operates as the device change detection section 101, the table generation section 103, the manipulation guidance output determination section 104, and the control section 105. By operating in accordance with the procedure of the executed computer program, the CPU 110 functions as these component elements.

Hereinafter, an outline of the operation of the guidance providing unit 100 will be described. As described above, a plurality of types of manipulation targets (a plurality of types of storage media), which are switchably used, exist in the recorder 1.

The CPU 110 detects switching of the manipulation target by a user. For example, when a mode (videotape mode) for manipulations directed to videotape is switched by the user to a mode for manipulations directed to the HDD or DVD (HDD mode, DVD mode), or when a new storage medium is inserted in the recorder 1, the CPU 110 detects a switching of the manipulation target.

Upon detecting a switching of the manipulation target, the CPU 110 generates a manipulation guidance output table by referring to a manipulation guidance database 39 which is stored in the database storage section 102. In the manipulation guidance output table, functions of manipulation targets are classified into common functions which are to be executed commonly for the manipulation targets before and after a switching manipulation and unique functions which are not to be executed commonly.

If the function designated by the user to be executed pertains to a common function, the CPU 110 determines that a confirmation message concerning a switching of the manipulation target is to be presented. On the other hand, if the designated function pertains to a unique function, it determines that a confirmation message concerning a switching of the manipulation target, as well as a confirmation message concerning the designated function, is to be presented. Then, a presentation signal for presenting the confirmation message(s) is output to the recorder 1. As a result, the recorder 1 presents the confirmation message(s) based on the presentation signal.

According to the above process, upon detecting a switching of the storage medium, the guidance providing unit 100 causes the recorder 1 to present at least a confirmation message concerning the switching of the manipulation target. The confirmation message may be a message asking for confirmation as to whether the switching of the storage medium may not be a mistake, or a message indicating a method of switching manipulation, for example. Since the switching manipulation is a manipulation with which the user is likely to be wrong, this message can greatly reduce manipulation mistakes.

Furthermore, in accordance with the substance of the function designated to be executed, the guidance providing unit 100 determines whether or not to present a guidance sentence concerning a manipulation of executing that function.

When receiving an instruction to execute a function whose manipulation method is inferred to be unknown to the user, a confirmation message concerning that function is presented. For example, when the videotape mode is switched to the HDD mode, "List of recorded programs", which displays a list of programs recorded on the HDD, is not among the videotape functions; therefore, it is inferred that the user does not know the substance of this function. Accordingly, a confirmation message (guidance explanation) for this function is presented. As a result, the user's manipulation mistakes concerning functions which are inferred to be unknown can be reduced.

On the other hand, when receiving an instruction to execute a function of which it is inferred that the user knows the manipulation method, a confirmation message concerning that function is not presented. For example, functions such as playback, recording, fast-forward, and rewind exist for all storage media, and thus, when the videotape mode is switched to the HDD mode, it is inferred that the user knows the substance of these functions. Therefore, no confirmation message (guidance explanation) is presented for instructions to execute them. As a result, the user does not need to perform unnecessary manipulations, whereby the user's burden can be reduced as compared to the case of displaying a help for everything.

Whether a function is inferred to be known or unknown to the user can be based on whether it is a common function or a unique function as described above.

Description of the Respective Component Elements of the Guidance Providing Unit 100:

The device change detection section 101 detects a change in the number and type of storage media being usable to the user, as well as a manipulation input from the user. This detection is performed based on an interrupt signal which is input from the bus 300 of the recorder 1. This interrupt signal is a signal which is output from the DVD drive 304a, the cassette deck 304c, or the card slot 304d of the recorder 1 when detecting an insertion of a corresponding storage medium. An interrupt signal is also output from the photodetecting section 308 or the like when detecting an input from the user via an input device such as the remote control 3.

In the case where a plurality of storage media are retained in a usable state inside the recorder 1, if an instruction is input from the user to switch to a storage medium which is different from the storage medium that has been so far manipulated, the device change detection section 101 detects a change in the number of storage media. This means that a target of manipulation has been added. On the other hand, if the user inserts a new storage medium, the device change detection section 101 detects a change in the type of storage medium.

When detecting a change in the number or type of storage media, the device change detection section 101 outputs information of the changed storage medium (storage medium change information). When detecting a manipulation input, the device change detection section 101 outputs function information describing a function to be executed by the manipulation. Detection of changes in the number or type of storage media and manipulation inputs is always performed while the user is using the recorder 1, and nothing is output if neither is detected.

The method of describing the storage medium change information may be such that a storage medium being used before the change and a storage medium after the change are described, e.g., "VIDEO ⇒ DVD". The method of describing the function information may be such that a function corresponding to the input manipulation is described, e.g., "Play DVD".

The database storage section 102 retains the manipulation guidance database (DB) 39. The manipulation guidance DB 39 contains data of guidance sentences concerning switching manipulations of the manipulation target and data of guidance sentences concerning a manipulation of executing a function assigned to each manipulation target.

FIG. 4 shows a data structure of the manipulation guidance DB 39. Guidance sentences concerning switching manipulations are described, one for each storage medium, in a "switching guidance" column on the left-hand side of the manipulation guidance DB 39. In this column, guidance sentences such as "To switch to HDD, press "HDD" button" are described, for example.

On the other hand, guidance sentences concerning manipulations of executing functions are described, one for each function of each storage medium, in a "function guidance" column on the right-hand side of the manipulation guidance DB 39. In this column, guidance sentences such as "To play back recorded program, press Play button" are described, for example.

The reason for adopting such a data structure is as follows. As mentioned earlier, new functions of which a user can infer the manipulation methods and the substance of manipulations are frequently found among devices which have the same type of functions but differ in the number or type of storage media. New functions in such devices can be generally classified into two types: new functions which emerge when the number of storage media handled by the user varies; and new functions which emerge from a difference in the type of storage medium. Among these, new functions which emerge when the number of storage media varies are characterized in that they are also associated with common functions of storage media whose functional substance is already known to the user, e.g., playback and recording. On the other hand, new functions which emerge from a difference in the type of storage medium is characterized in that they individually differ in the manipulation method and the substance of the function.

Therefore, when a change in the number of storage media has occurred, it will be appropriate to provide switching guidance to offer an explanation of common functions regarding the new functions emerging therefrom, and when a change in the type of storage medium has occurred, it will be appropriate to provide function guidance to offer an explanation of individual new functions emerging therefrom. By distinguishing between the manipulation guidance which is presented concerning a change in the number of storage media and the function guidance which is presented concerning a change in the type of storage medium, it becomes easy to generate the subsequently-described manipulation guidance output table. The data structure of the manipulation guidance output table will be described later.

Note that functions which are included in conventional devices are also deemed as new functions in the recorder 1. For example, in order to realize a playback function for a content, a "Play" button may be simply pressed on a single-purpose recorder, whereas in the recorder 1, it is necessary to switch to a storage medium on which to play back a content before the "Play" button is pressed. The reason is that a content playback function exists for each of the DVD 4a/the hard disk/the video cassette 4c/the memory card 4d as the playback function in the recorder 1. Therefore, although the playback function of a DVD recorder which integrates four storage media is a function similar to the playback function of a conventional single-purpose recorder, it is a new function in terms of the system of manipulations.

In every entry of switching guidance and function guidance in the manipulation guidance DB 39, identification information (not shown) such as text, a tag, or an ID is assigned. The identification information makes it possible to identify which storage medium or which function the guidance concerns. Such identification information makes it possible to sort the entries (guidance sentences) of the manipulation guidance DB 39 in an arbitrary order, or delete them.

Referring back to FIG. 3, upon determining that a switching of the manipulation target has been detected based on the change information, the table generation section 103 generates a manipulation guidance output table 40, based on the manipulation guidance DB 39 acquired from the database storage section 102. In the manipulation guidance output table 40, the respective executable functions are classified on the basis of storage media as the manipulation targets.

Figures 5, 6:
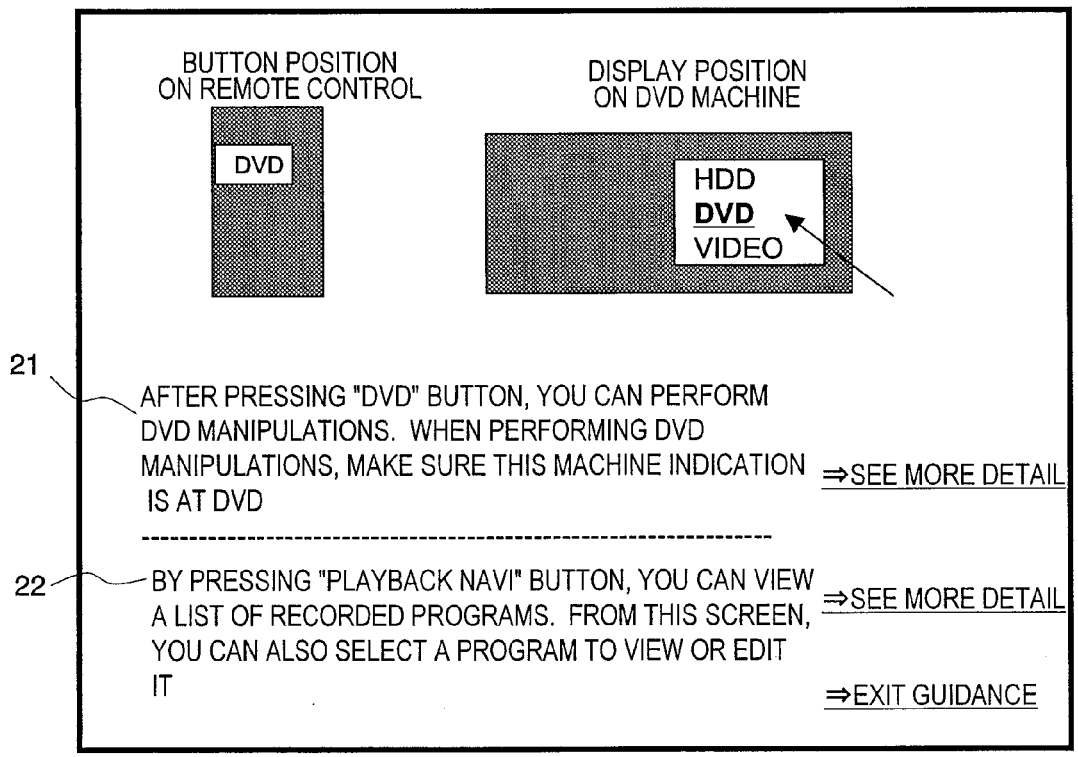
FIG. 5 A diagram showing the data structure of a manipulation guidance output table 40.
FIG. 6 A diagram showing an exemplary displayed image of manipulation guidance.

FIG. 5 shows the data structure of the manipulation guidance output table 40. Functions concerning the videotape, DVD and HDD are classified into a left column, a middle column, and a right column. Moreover, the more common functions which are executed commonly among storage media, e.g., "Play" function, are placed in the upper portion of the table, commonly across storage media. On the other hand, the more unique functions which are not executed commonly, e.g., "Erase" function for only the HDD, are placed in the lower portion of the table. The placement may be established by, for example, searching through the identification information assigned to the respective entries of the manipulation guidance DB 39, and placing the functions in descending order of frequency of coincidence among storage media, starting from the upper portion.

Such classification is made in order to precisely determine whether or not the user is able to infer the manipulation method or substance of manipulation. Specifically, when the number of storage media has changed, the user is able to infer the manipulation method or substance of manipulation if the substance of the function is already known to the user, e.g., "Play" or "Record". On the other hand, when the type of storage medium has changed, the functions which are unique to that storage medium are characterized in that they differ in terms of the manipulation methods for executing the functions of each storage medium and the substance of functions, and therefore the user is unable to infer the manipulation methods or substance of manipulations. Thus, by constructing the manipulation guidance output table 40 as shown in FIG. 5, it becomes possible to precisely determine whether or not the user is able to infer the manipulation method or substance of manipulation, in accordance with both a change in the number of storage media and a change in the type of storage medium.

A switching flag and a function flag are set for each function in the manipulation guidance output table 40. The switching flag indicates whether or not to output manipulation guidance concerning a switching manipulation for storage media. Manipulation guidance concerning switching manipulations is described in the switching guidance column in the manipulation guidance DB 39 shown in FIG. 4. The function flag indicates whether or not to output manipulation guidance concerning a functional manipulation for a storage medium. Manipulation guidance concerning functional manipulations is described in the function guidance column in the manipulation guidance DB 39 shown in FIG. 4.

In the present embodiment, both regarding the switching flag and the function flag, no manipulation guidance is output in the case of "OFF", and manipulation guidance is output in the case of "ON". "OFF" and "ON" may change through updates. Methods of setting and updating these flags will be specifically described later.

Referring back to FIG. 3, when instructed to execute a certain function by the user, the manipulation guidance output determination section 104 (hereinafter referred to as the "determination section 104") refers to the manipulation guidance output table 40, and if the function pertains to a common function, determines that manipulation guidance concerning switching of the manipulation target should be presented, or if the function pertains to a unique function, determines that manipulation guidance concerning the switching and manipulation guidance concerning the designated function should be presented.

This determination is made based on the switching flag and function flag in the manipulation guidance output table 40 that correspond to the designated function. In the case of "OFF", it is determined that no manipulation guidance is output, and in the case of "ON", it is determined that manipulation guidance is output. When outputting manipulation guidance, the determination section 104 generates data of the manipulation guidance to be presented based on the manipulation guidance DB 39 shown in FIG. 4.

FIG. 6 shows an exemplary displayed image of manipulation guidance. This manipulation guidance is to be displayed when the user has inserted a DVD, and thereafter performed a manipulation input (pressing of the "Playback navi" button) for executing the function of displaying a recording list.

In the manipulation guidance output table 40, it is assumed that the switching flag has been previously set to "ON", and the function flag to "ON", concerning the recording list function. Since both flags are "ON", switching guidance 21, which is a method of switching manipulation to the DVD, and function guidance 22 concerning the substance of manipulation of the function of displaying a recording list are indicated. In another instance, if the switching flag is set to "OFF" and the function flag to "ON" in the manipulation guidance output table 40, the switching guidance 21 will not be displayed.

When it is determined that manipulation guidance is to be output, the control section 105 gives an instruction to output manipulation guidance and also designates the substance of the manipulation guidance to be presented. When it is determined that no manipulation guidance is to be output, it gives an instruction to execute an operation corresponding to the function information which is output from the device change detection section 101.

The output section 106 is a terminal via which the instruction which is output from the control section 105 is output onto the bus 300 of the recorder 1. The instruction to output manipulation guidance and the substance of manipulation guidance are sent to the graphics control section 306, merged for displaying on the screen, or converted by the output circuit 307 so as to be output as audio. The instruction to execute the function is sent to the CPU 309, so that the function is executed by the CPU 309 and the like.

Figure 7:
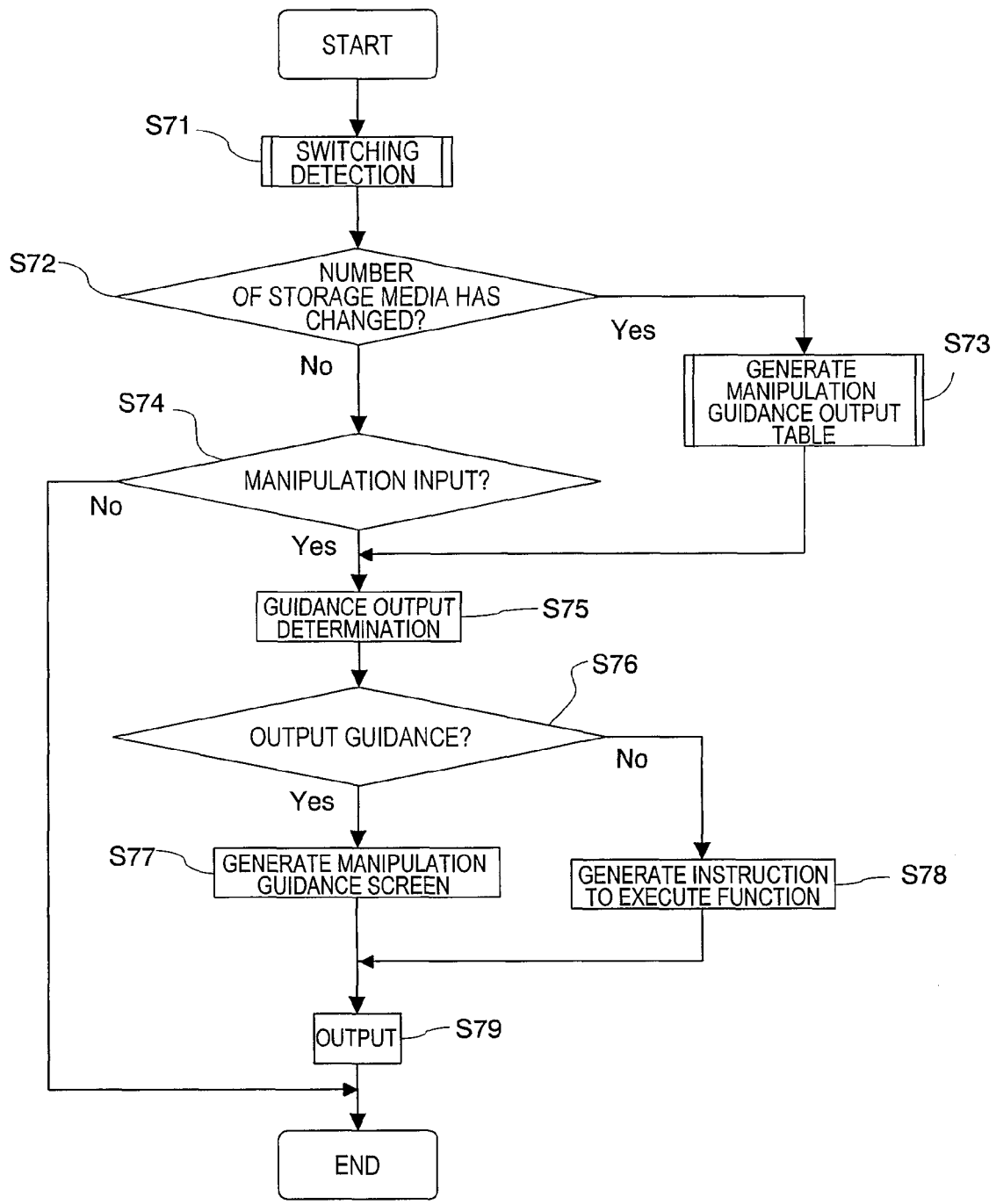
FIG. 7 A flowchart showing a procedure of processing by the guidance providing unit 100.

Description of the Processing by the Guidance Providing Unit 100:

FIG. 7 shows a procedure of processing by the guidance providing unit 100.

At step S71, the device change detection section 101 executes a process of detecting a switching of storage media. In this process, the device change detection section detects a change in the number or type of storage media that are usable to the user and determines a manipulation input from the user. Then, if a change in the number or type of storage media is detected, the device change detection section 101 outputs a piece of storage medium change information in which information of the changed storage medium is recorded. If a manipulation input is detected, the device change detection section 101 outputs a piece of function information in which a function to be executed by the manipulation is described.

Figure 8:
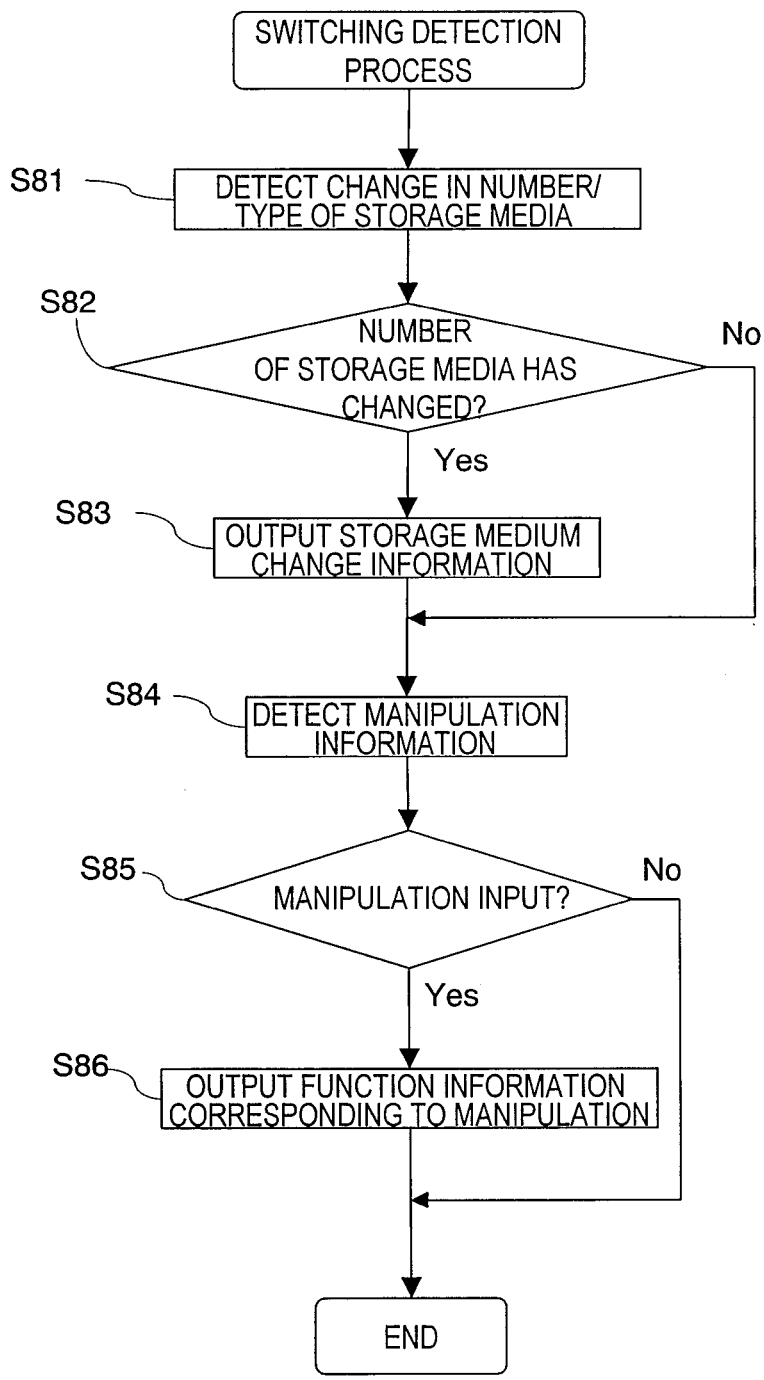
FIG. 8 A flowchart showing a detailed procedure of a switching detection process shown at step S71 in FIG. 7.

FIG. 8 shows a detailed procedure of the switching detection process shown at step S71 in FIG. 7. In executing this process, it is assumed that the device change detection section 101 retains information specifying the number and type of storage media up to then. Immediately after shipment of the recorder 1 from factory, this information is a piece of information specifying only the number and type of storage media internalized in the recorder 1; and after the process of FIG. 8 is executed, this information is a detection result from the immediately previous run.

At step S81, the number and type of storage media currently usable to the user are detected. Specifically, in a state where the user has inserted a videotape and a DVD into the recorder 1, the number of storage media is detected as "2" and the type as "VIDEO" "DVD".

The detection is performed based on an interrupt signal, which can be obtained by various methods. For example, a detection signal from a photosensor (not shown) which is attached to an insertion inlet for storage media may be used as an interrupt signal. As for DVDs, a sensor state immediately after the CLOSE button of the disk tray is pressed may be read for use as an interrupt signal, thus detecting whether a disk has newly been placed on the tray or not. As for memory-type storage media composed of semiconductor or the like, it is possible to detect whether a storage medium has been inserted or not on the basis of resistance in the electric circuitry or the like; therefore, a voltage change may be used as an interrupt signal.

As for the internalized storage media (e.g., HDD), any storage medium that can be subjected to a device manipulation may be detected. For example, if there are two hard disks internalized in the recorder 1 and it is possible to manipulate these two hard disks, then the number of storage media may be detected as "2", and the storage medium type as "HDD".

Note that the storage medium is not limited to media to be inserted into the device or media that are internalized in the device, but may be an externally-connected storage medium, e.g., an external hard disk or a camcorder. By monitoring the connection status of an external terminal such as a USB terminal or an IEEE1394 terminal, it is possible to determine whether a storage medium has been newly connected or not.

At step S82, the device change detection section 101 compares the retained information of the number of storage media against the number of storage media detected at step S81, and determines whether the number of storage media has changed or not. If it is determined that the number of storage media has changed, control proceeds to step S83; if it is determined that the number of storage media has not changed, control proceeds to step S84.

At step S83, the device change detection section 101 outputs storage medium change information. Storage medium change information is a piece of information which describes a detection result from the previous detection of change in the storage media and a detection result from the current detection of change in the storage media. For example, if the previous detection result finds the number of storage media to be "1" and the type to be "VIDEO", and if the detection result finds the number of storage media to be "2" and the type to be "VIDEO" and "DVD", then the storage medium change information will be "number:1 ⇒ 2 type:VIDEO ⇒ VIDEO, DVD".

At step S84, the device change detection section 101 detects presence or absence of an input of manipulation information from the user, based on an interrupt signal. Manipulation information is a piece of information which is input from a manipulation input interface such as a button on a remote control or the device.

At step S85, the device change detection section 101 determines whether manipulation information has been input at step S84. If it is determined that manipulation information has been input, control proceeds to step S86; if it is determined that no manipulation information has been input, the process is ended.

At step S86, the device change detection section 101 outputs function information corresponding to the manipulation information. Function information is a piece of information which describes the name of a function to be executed, e.g., "Play DVD" or "Record on HDD".

After the processes of steps S81 to S86 above, the process proceeds to step S72 in FIG. 7.

Referring back to FIG. 7, at step S72, the table generation section 103 determines whether a change in the number of storage media has occurred or not, based on the presence or absence of storage medium change information generated at step S71. If it is determined that the number of storage media has changed, control proceeds to step S73; if it is determined that the number of storage media has not changed, control proceeds to step S74.

At the next step S73, by using the storage medium change information acquired from the device change detection section 101 and the manipulation guidance DB 39 acquired from the manipulation guidance DB section 102, the table generation section 103 generates a manipulation guidance output table 40 in which flags for outputting manipulation guidance are designated. The detailed procedure of this process is described in FIG. 9.

Figure 9:
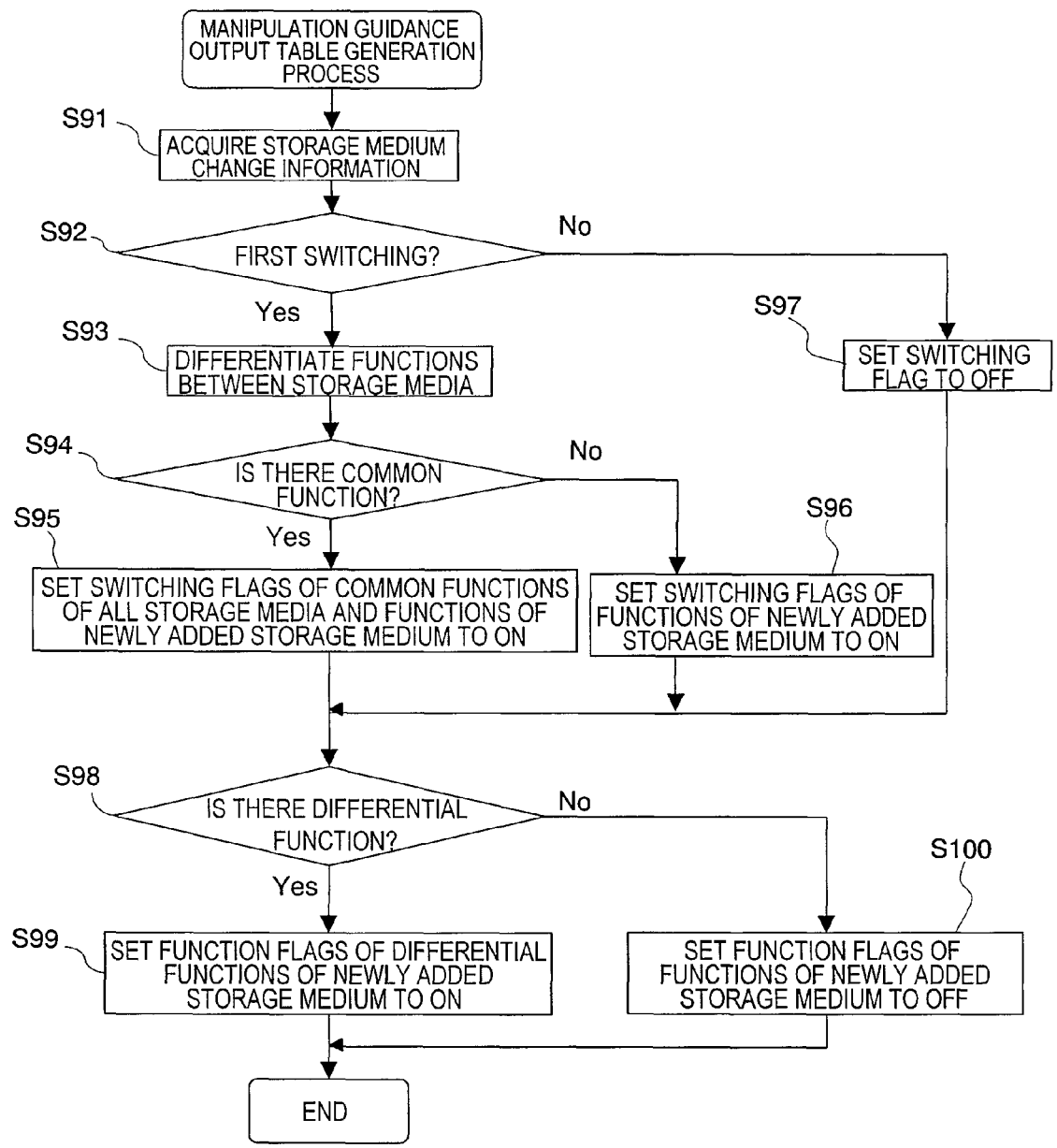
FIG. 9 A flowchart showing a detailed procedure for generating the manipulation guidance output table 40 shown at step S73 in FIG. 7.

FIG. 9 shows a detailed procedure for generating the manipulation guidance output table 40 shown at step S73 in FIG. 7.

At step S91, the table generation section 103 acquires the storage medium change information which is acquired from the device change detection section 101.

At step S92, the table generation section 103 determines whether the change in the storage media described in the storage medium change information acquired at step S91 is a change in the storage media which has occurred for the first time to the user using it. If it is a change which has occurred for the first time to the user, control proceeds to step S93; if it is not a change which has occurred for the first time to the user, control proceeds to step S97.

As the determination method, for example, changes in the storage media that the user has ever dealt with since the start of use of the recorder 1 may be recorded all the time, and a comparison may be made between the recorded history of changes in the storage media and the change in the storage media detected each time.

At step S93, by using the manipulation guidance DB acquired from the manipulation guidance DB section 102, regarding the storage media described in the storage medium change information, the table generation section 103 performs a differentiation process for the functions of the storage medium after the change, relative to the functions of the storage medium before the change.

As used herein, the differentiation process is a process of comparing all the functions of the storage medium after the change and all the functions of the storage medium before the change, and establishing a classification of common functions and unique functions concerning both storage media. A common function is a function that is executed commonly for two storage media which are different types of storage media. For example, Play DVD and Play HDD are common functions. A unique function is a function which is not executed commonly for both storage media.

For example, assuming that the information concerning the type of storage medium is "DVD ⇒ HDD" in the storage medium change information acquired at step S91, the table generation section 103 may perform a differentiation process between the functions of the HDD and the functions of the DVD by using the information described in the manipulation guidance DB 39 shown in FIG. 4.

At step S94, based on the result of the differentiation process of step S93, the table generation section 103 determines presence or absence of common functions. If it is determined that there is any common function, the process proceeds to step S95; if it is determined that there is no common function, the process proceeds to step S96.

At step S95, the table generation section 103 sets the switching flags of device manipulation guidance. Specifically, the table generation section 103 sets the switching flags for the common functions of all of the storage media described in the storage medium change information to ON, and sets the switching flags for all functions of the storage medium after the change to ON. As a result, manipulation guidance concerning switching will always be output. Note that, because they are output for a plurality of functions, the switching flags may be set to OFF after having been output a certain number of times or more.

At step S96, the table generation section 103 sets the switching flags of the functions of any newly added storage medium to ON. Since this step S96 is executed when there are no overlapping functions, manipulation guidance concerning switching is output concerning the functions of any newly added storage medium.

At step S97, the table generation section 103 sets the switching guidance flags for the storage medium after the change, described in the storage medium change information, to OFF. The reason why they are set to OFF is that, since this process is executed when step S92 determines that it is not the first time of switching, the user already knows that switching is necessary, and thus it can be said that there is no need to present manipulation guidance concerning switching any more.

At step S98, the table generation section 103 determines whether any differential function exists or not, from the result of the differentiation process at step S93. If there is any differential function, control proceeds to step S99; if there is no differential function, control proceeds to step S100. As a method for determining presence or absence of differential functions, for example, presence of a differential function may be determined when the result of the differentiation process is not 0, and absence of differential functions may be determined when the result of the differentiation process is 0.

If step S98 determines that a differential function(s) exists, then at step S99, the table generation section 103 sets the function guidance flag for the detected differential function(s) to ON.

If step S97 determines that there is no differential function, then at step S100, the table generation section 103 sets the function guidance flag corresponding to differential functions to OFF.

Through the process from steps S91 to S100 above, at step S73 of FIG. 7, the table generation section 103 is able to generate a manipulation guidance output table 40 in which flags for outputting manipulation guidance are designated.

Referring back to FIG. 7, step S74 and after will be described.

At step S74, the determination section 104 determines presence or absence of a manipulation input based on the result of the process of step S71. If it is determined that there is a manipulation input, the process is ended; if it is determined that there is no manipulation input, control proceeds to step S75. The determination may be made based on presence or absence of function information detected at step S71.

Next, at step S75, it is determined whether the determination section 104 should output manipulation guidance or not. Specifically, in the manipulation guidance output table 40 generated at step S73, the determination section 104 identifies a function corresponding to the function information which is output at step S71. Then, referring to the switching flag and function flag of that function, if the flag is ON, it determines that guidance is to be output, and if the flag is OFF, it determines that no guidance is to be output.

Next, at step S76, the determination section 104 switches the process depending on whether or not to output manipulation guidance. If manipulation guidance is to be output, the process proceeds to step S77; if it is not to be output, the process proceeds to step S78.

At step S77, the determination section 104 generates screen data or audio data of the manipulation guidance. As the method of generating manipulation guidance, the manipulation guidance DB 39 may be referred to on the basis of the flag of the function information for which it has been determined at step S75 that manipulation guidance is to be output, and the guidance sentences for the corresponding function may be arranged.

At step S78, the control section 105 generates an instruction to execute the function which is described in the input function information.

Next, at step S79, the output section 106 outputs data for presenting the manipulation guidance which has been generated at step S77. At this time, the output section 106 receives from the control section 105 an instruction to output manipulation guidance, and outputs it together with the data. Alternatively, the output section 106 outputs the instruction to execute a function which has been generated at step S78.

By performing steps S71 to S79 above, in the case where the number of storage media changes, the guidance providing unit 100 is able to output guidance on switching manipulations for storage media common to a plurality of functions, and in the case where the type of storage medium changes, able to output manipulation guidance only for the differential functions belonging to the newly added storage medium. Thus, even if it is a new function becoming executable at the addition of a new storage medium, no unnecessary manipulation guidance is provided for any function of which the user is able to infer the manipulation, so that manipulation guidance is only output for functions of which the manipulation methods or substance of manipulations is unknown.

Figure 10:
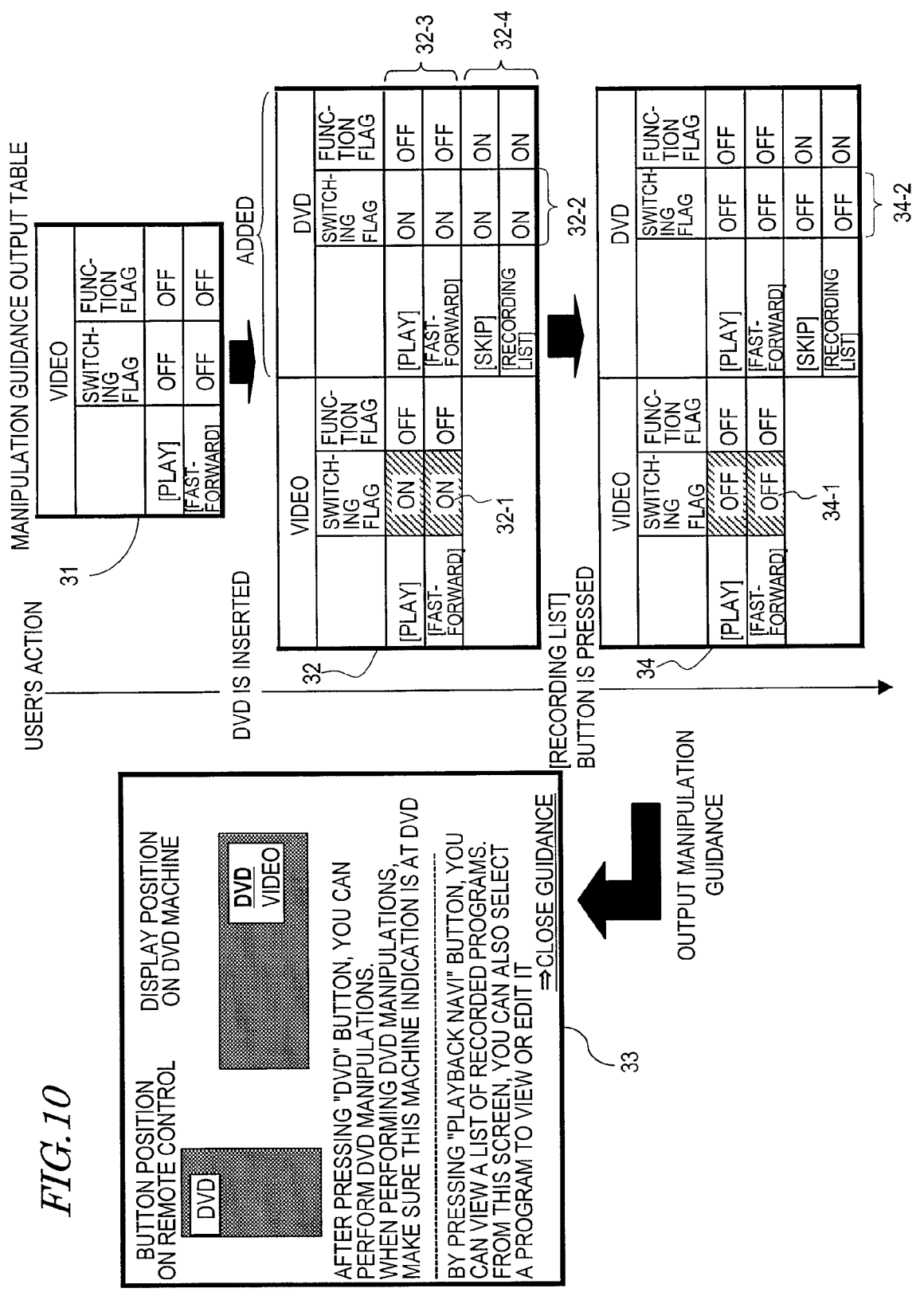

Now, with reference to FIG. 10, changes in the manipulation guidance output table related to output of manipulation guidance will be described. FIG. 10 shows changes in the manipulation guidance output table and an output instance of manipulation guidance corresponding to a user's actions.

As a premise, it is assumed that this user has performed VCR manipulations for a certain period or longer since starting to manipulate the recorder 1, and is accustomed to the manipulations of the VCR. It is assumed that, over the course of this, the manipulation guidance output table 31 has already been generated and manipulation guidance output determination has been made based on that table.

First, when the user inserts a DVD into the recorder 1, the device change detection section 101 outputs a piece of storage medium change information whose substance is "VIDEO ⇒ DVD". As a result, the table generation section 103 rewrites the manipulation guidance output table 31 into a manipulation guidance output table 32.

Figures 11, 12:
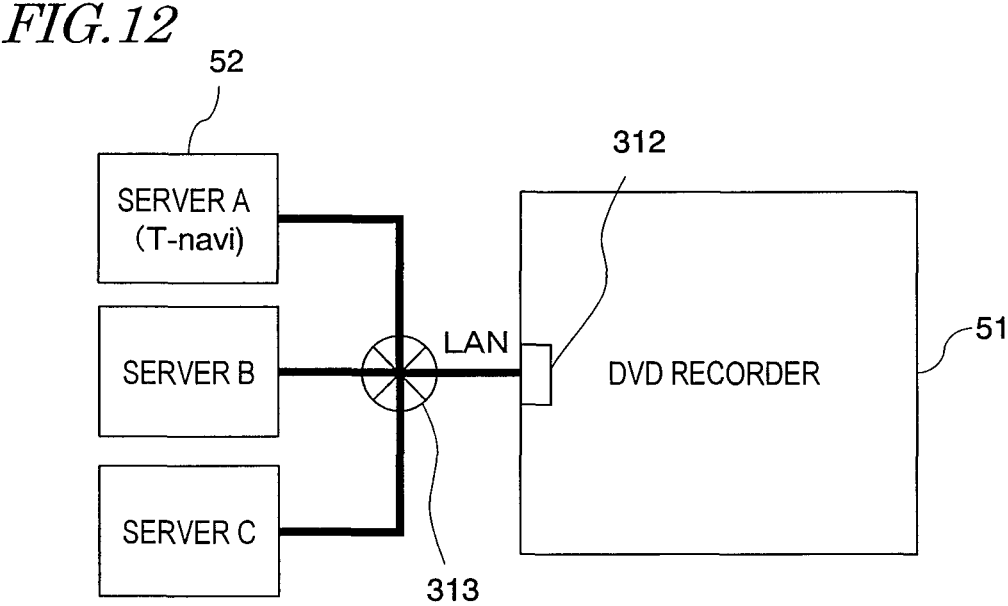
FIG. 11 A diagram showing a manipulation guidance DB 39 in which only portions concerning DVD functions and VCR functions are shown.
FIG. 12 A diagram showing a DVD recorder 51 which is connected to a network 313 by using a LAN terminal 312 and a LAN cable.

The rewriting procedure is as follows. First, differences between the DVD function and the VCR function described in the manipulation guidance DB 39 are taken. For example, FIG. 11 shows a manipulation guidance DB 39 in which only portions concerning DVD functions and VCR functions are shown. FIG. 11 shows common functions 42 and unique functions 43. By taking differences in them, and adding switching flags and function flags, the manipulation guidance output table 32 is obtained.

Referring back to FIG. 10, items concerning DVD have been added to the manipulation guidance output table 32. Regarding common functions 32-3 such as "Play" and "Fast-forward", switching flags 32-1 as to "Play" and "Fast-forward" for VCR, which is the storage medium before the change, and switching flags 32-2 of all DVD functions ("Play", "Fast-forward", "Skip" "Recording list", etc.) are set to ON. On the other hand, regarding unique functions 32-4 such as "skip" and "Recording list", the function flags are set to ON.

Next, suppose that the user has pressed a "Recording list" button. Since the manipulation guidance output table 32 indicates that its switching flag and function flag are both ON, manipulation guidance as shown in an exemplary screen 33 is output. These manipulation guidance sentences are the same as in the example of FIG. 6. FIG. 10 shows manipulation guidance sentences for both the switching guidance 21 and the function guidance 22 in FIG. 6.

Presenting such manipulation guidance sentences is believed to be convenient to the user. The reason is that, presumably, the user's pressing of the "Recording list" button is not because the user has meant to execute the recording list function, but it was performed while not being sure because it was a first function to be executed with respect to DVD. In other words, it is presumed that a user having performed a first manipulation concerning a unique function of DVD would not know in the first place that it is necessary to perform a manipulation of switching from the videotape mode to the DVD mode.

Thereafter, the table generation section 103 generates a manipulation guidance output table 34 in which the switching flags 34-1 and 34-2 are updated to OFF because it is presumable that the user has learned the switching manipulation between VCR and DVD. Therefore, by referring to the manipulation guidance output table 34, it is ensured that the method of switching manipulation is not displayed even for the new functions concerning DVD functions. Similarly, no manipulation guidance is output for the functions of "Play DVD" and "Fast-forward DVD", which are new functions concerning DVD but whose substance is inferred to be known because of being common functions. Therefore, the user does not need to perform any additional manipulations against unnecessary manipulation guidance.

On the other hand, the function flags concerning the unique functions of DVD are still ON in the manipulation guidance output table 34. Therefore, it is possible to output manipulation guidance only for new functions emerging from a difference in the type of storage medium.

Thus, by assigning a switching flag and a function flag to each function of a device having a plurality of storage media, and adjusting ON or OFF of these flags with respect to the new functions occurring with a change in the number and type of storage media to be manipulated, it becomes possible to switch the substance of the manipulation guidance for output, discern new functions of which the manipulation methods and the substance of manipulations can be inferred, and automatically output manipulation guidance only for functional manipulations that are unknown to the user.

(Embodiment 2)

In Embodiment 1, the manipulation targets were illustrated as being storage media. However, in the present embodiment and the next embodiment, examples of manipulation targets other than storage media will be described.

For example, in the case where servers from which to receive information providing services are provided by a plurality of business entities on a network, when the recorder is connected to the network, the user is able to select a server from which to receive an information providing service, by utilizing the remote control 3. Then, from the selected server, the recorder can receive information which is directed to the viewer.

In the present embodiment, it is assumed that the switchable manipulation targets are a plurality of types of servers from which the recorder receives information providing services. For example, in the case where it is possible to connect a television set and a DVD recorder to a network via a LAN cable and acquire program information or the like from a connection destination, each server at the connection destination can be treated as a switchable manipulation target. When a LAN cable is connected to the LAN terminal 312, the number and type of available servers are identified. By ensuring that guidance sentences for substance of functions that are executable by using the device at the connection destination are described in the manipulation guidance DB 39, it becomes possible for the guidance providing unit included in the DVD recorder to output manipulation guidance by the same method as in Embodiment 1.

Note that various methods are conceivable for the guidance providing unit to acquire the manipulation guidance DB. For example, in the case where the functions of a service at the connection destination change in real time, a text file in a file format that is in accordance with the manipulation DB (e.g., CSV file format) may be generated at the servicing end, which the device may download via the network and register to the manipulation guidance DB. In the case where the functions of the service at the connection destination do not change in real time, the manipulation guidance DB may be generated in advance at shipment.

FIG. 12 shows a DVD recorder 51 which is connected to a network 313 by using a LAN terminal 312 and a LAN cable. The DVD recorder 51 can be connected to a plurality of servers such as server A 52 via the network 313. As switchable connection destinations, servers of T-navi Service, Gyao, Tsutaya-Online, and the like are known, for example. The user can determine which server to connect to. Note that the DVD recorder 51 is identical to the recorder 1 shown in FIG. 2 except for the guidance providing unit 100 performing an operation according to the present embodiment.

In the following description, a state is assumed where a LAN cable has been connected to the LAN terminal 312 and communications with a server of T-navi Service have been established. Note that, after a server is selected, differences in its relationship with the existing functions (which are assumed herein to be functions that are available in the DVD mode) of the DVD recorder 51 are taken, whereby it is determined whether or not to present manipulation guidance.

Figure 13:
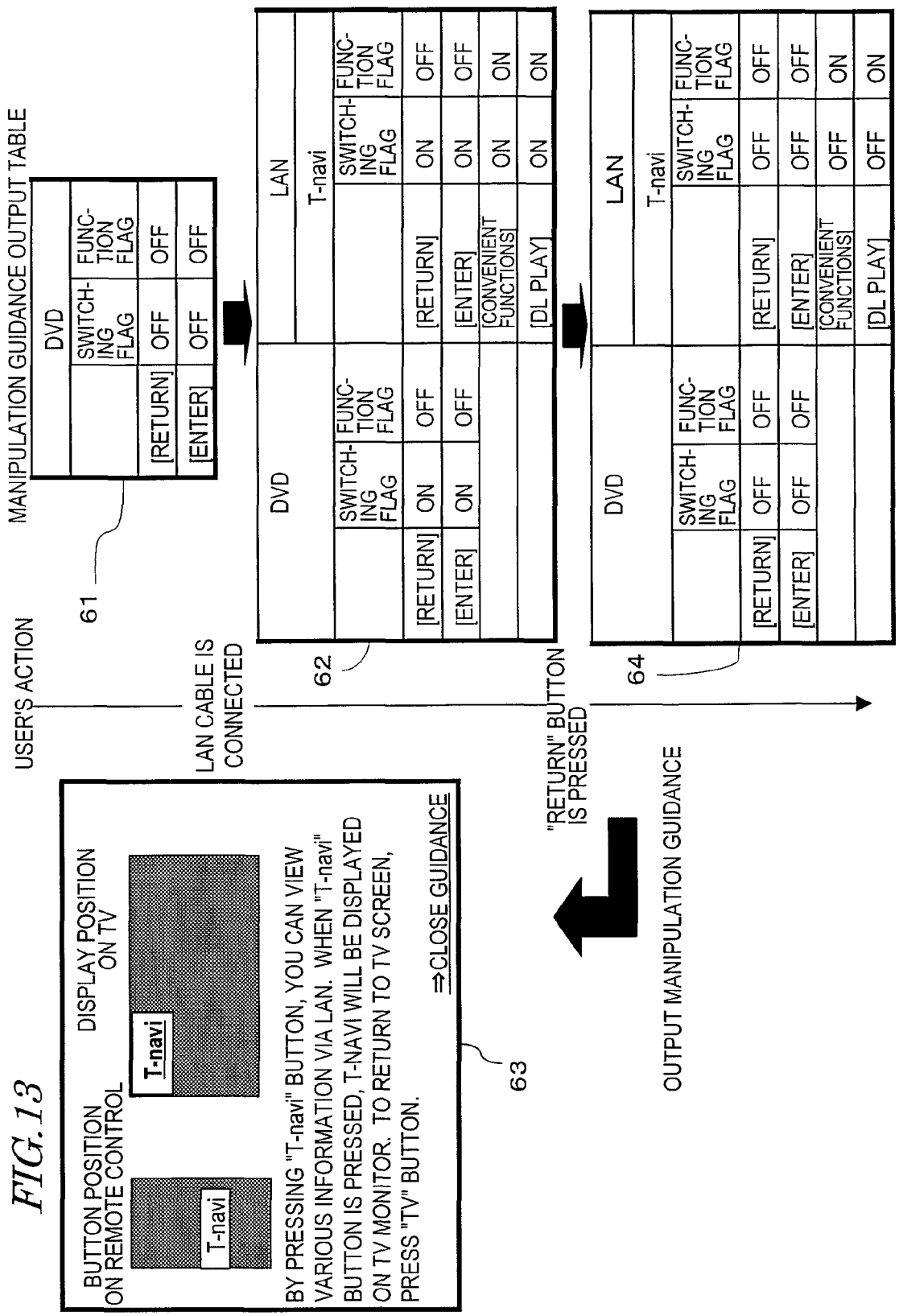
FIG. 13 A diagram showing an exemplary operation when a LAN cable is connected to a DVD recorder.

FIG. 13 shows an exemplary operation when a LAN cable is connected to the DVD recorder. FIG. 13 corresponds to FIG. 10. Hereinafter, by using FIG. 12 and FIG. 13, an operation of outputting manipulation guidance when a LAN cable is connected to the DVD recorder will be described.

As a premise, it is assumed that this user has performed manipulations for a certain period or longer since starting to manipulate the recorder 51, and is accustomed to the manipulations of the DVD recorder 51 in the DVD mode. It is assumed that, over the course of this, the manipulation guidance output table 61 has already been generated and manipulation guidance output determination has been made based on that table.

First, when the user connects a LAN cable to the DVD recorder, the device change detection section 101 detects a service (T-navi) at the destination of connection with the LAN cable, and outputs storage medium change information whose substance is "DVD ⇒ XT-navi". As a result, the table generation section 103 rewrites the manipulation guidance output table 61 into a manipulation guidance output table 62.

The rewriting procedure is similar to that of Embodiment 1. Specifically, differences between the DVD functions which are previously described in the manipulation guidance DB and the T-navi functions are taken. Regarding "Return" and "ENTER", which are common functions, the switching flags for "Return" and "ENTER" of DVD before the change are rewritten to ON; and the switching flags for all functions of T-navi ("Return", "ENTER", "Convenient functions", "DL play") are rewritten to ON. Regarding "Convenient functions" and "DL play", which are differential functions, the function flags are further rewritten to ON.

Next, suppose that the user has pressed a "Return" button. The "Return" button is pressed during a DVD manipulation. Since the manipulation guidance output table 62 indicates that its switching flag is ON, manipulation guidance as shown in an exemplary screen 63 is output. Thereafter, with the displaying of this manipulation guidance, the storage medium switching flag in the manipulation guidance output table 62 changes from ON to OFF, and is rewritten as in a manipulation guidance output table 64. As a result, the user has learned the switching manipulation between DVD and T-navi. Thus, without outputting unnecessary guidance for "Return to T-navi" and "Select T-navi", which are new functions but whose functional substance is known, it is possible to output guidance only for new functions emerging from a difference in type between DVD and T-navi (service at the destination of connection with the LAN cable).

As described above, by using a server at a connection destination via a network as the manipulation target, when newly using a device in which a plurality of them are combined, it is ensured that unnecessary manipulation guidance is not provided for any function which may be a new function but whose manipulation is inferable to the user, and that manipulation guidance is output only for functions of which the manipulation methods or substance of manipulations is unknown. It is also possible to reduce manipulations against unnecessary guidance, thus reducing the user's burden of manipulation.

Note that, even when the number and type of servers have changed, a help concerning the switching manipulation and differences between the functions before the change and the functions after the change may be displayed.

(Embodiment 3)

DVD recorders of the recent years are often equipped with a plurality of types of tuners respectively supporting broadcasting systems such as terrestrial analog broadcast, terrestrial wave/BS digital broadcast, and CS broadcast. Some are capable of receiving broadcasts in cooperation with external tuners that support broadcasting systems. The user is able to select any arbitrary tuner by utilizing the remote control 3 or the like. As a result, by utilizing a DVD recorder, the user is able to view and record a program of the selected broadcasting system.

In the present embodiment, tuners respectively supporting terrestrial analog broadcast, terrestrial digital broadcast, BS digital broadcast, CS broadcast, and the like serve as the switchable manipulation targets. The guidance providing unit included in the DVD recorder instructs the DVD recorder as to whether or not to display manipulation guidance for such manipulation targets.

When tuners respectively supporting broadcasts such as terrestrial analog broadcast, terrestrial digital broadcast, BS digital broadcast, and CS broadcast are available, or when external tuners and cables are connected in a manner similar to network connection, the recorder rewrites the manipulation guidance output table by regarding the tuners as switchable manipulation targets. As a result, it is possible to allow manipulation guidance to be output only for new functions of the tuners emerging from differences in the type of broadcast.

Figure 14:
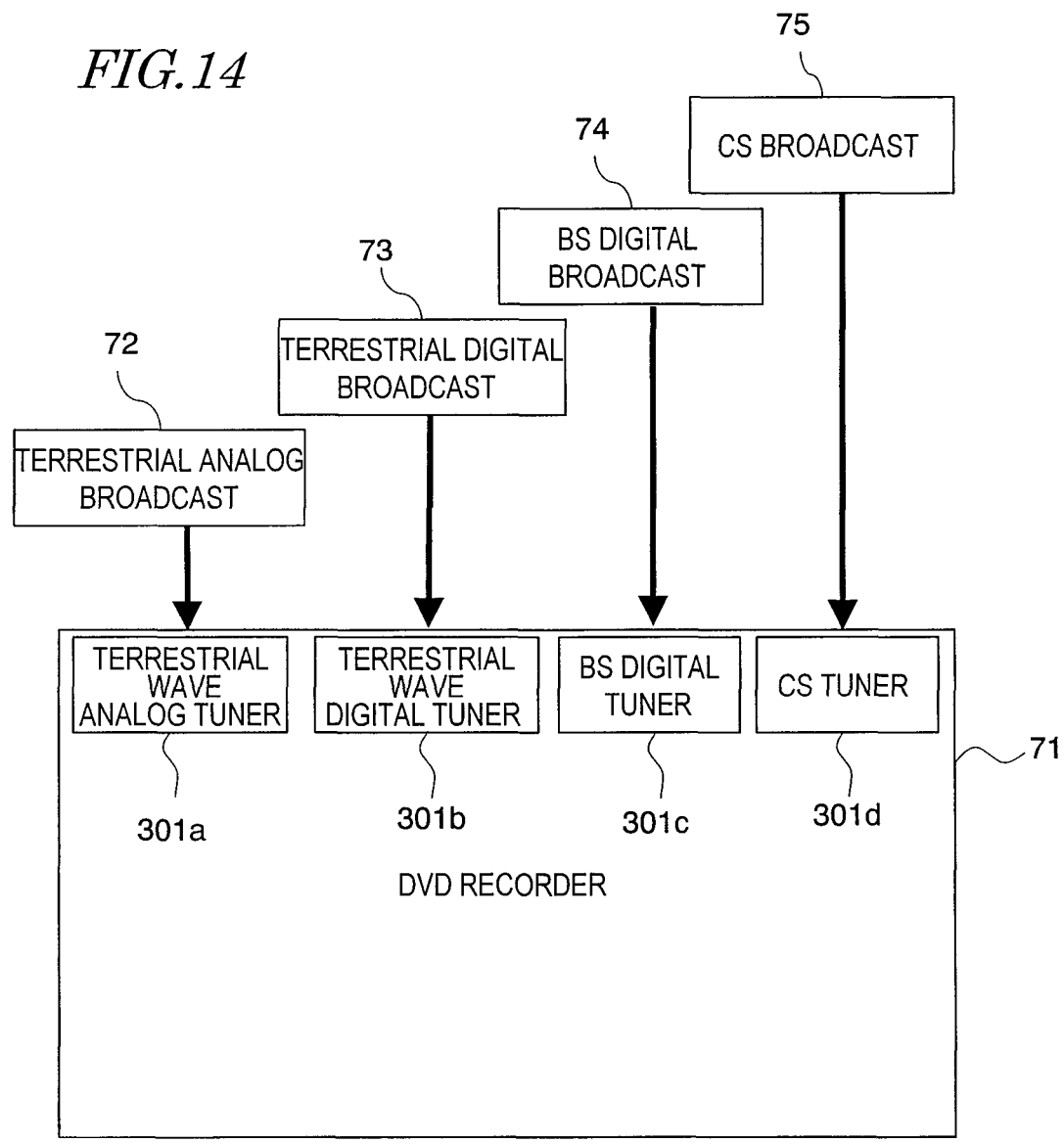
FIG. 14 A diagram showing the construction of a DVD recorder 71 having a plurality of tuners.

FIG. 14 shows the construction of a DVD recorder 71 having a plurality of tuners. The DVD recorder 71 includes a terrestrial wave analog tuner 301*a*, a terrestrial wave digital tuner 301*b*, a BS digital tuner 301*c*, and a CS tuner 301*d*, and by switching between them, is capable of receiving terrestrial analog broadcast (Terrestrial A) 72, terrestrial digital broadcast (Terrestrial D) 73, BS digital broadcast (BSD) 74, and CS broadcast (CS) 75, respectively. Note that, although each tuner is provided inside the DVD recorder 71 in FIG. 14, they may be externally connected to the DVD recorder 71.

FIG. 15 shows a manipulation guidance output table 81 according to the present embodiment. As in the above Embodiments, common functions between tuners and unique functions of each tuner are classified in the manipulation guidance output table 81. The manipulation guidance output table 81 utilizes switching flags and function flags to describe whether or not to output manipulation guidance for the terrestrial wave analog tuner, the terrestrial wave digital tuner, the BS digital broadcast, and the CS broadcast.

Figure 16:
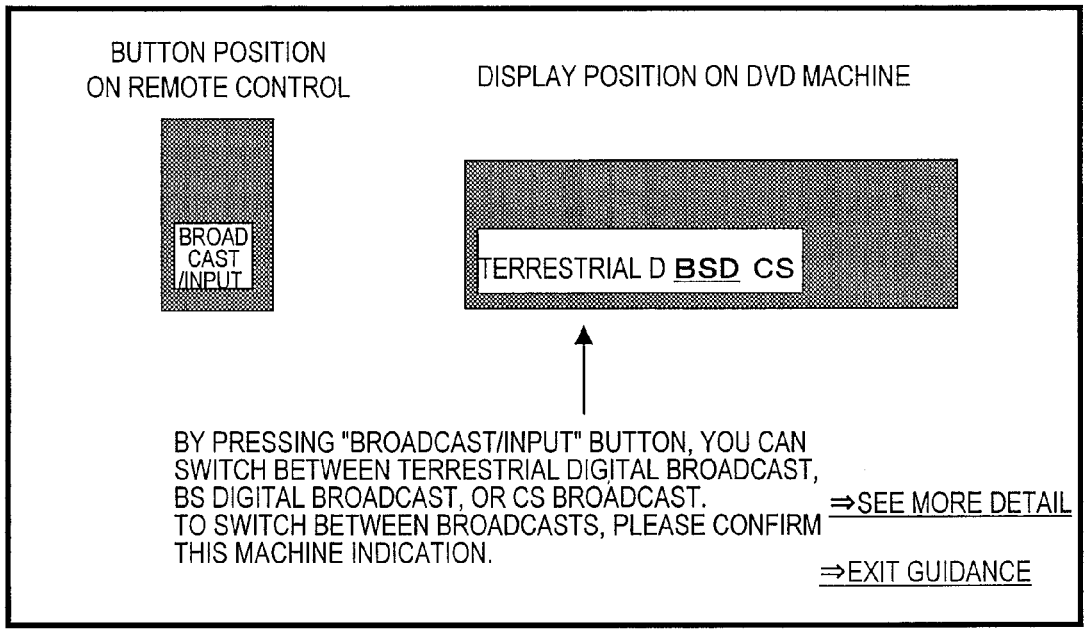
FIG. 16 A diagram showing, in an operation of a terrestrial wave analog tuner, an output instance of manipulation guidance concerning a switching manipulation when switching to a CS tuner.

FIG. 16 shows, in an operation of the terrestrial wave analog tuner, an output instance of manipulation guidance concerning a switching manipulation when switching to the CS tuner. This manipulation guidance is output when a broadcast switching is executed for the first time, or when a common function such as the channel function or ENTER function described in the manipulation guidance output table 81 shown in FIG. 15 is executed, for example.

Figure 17:
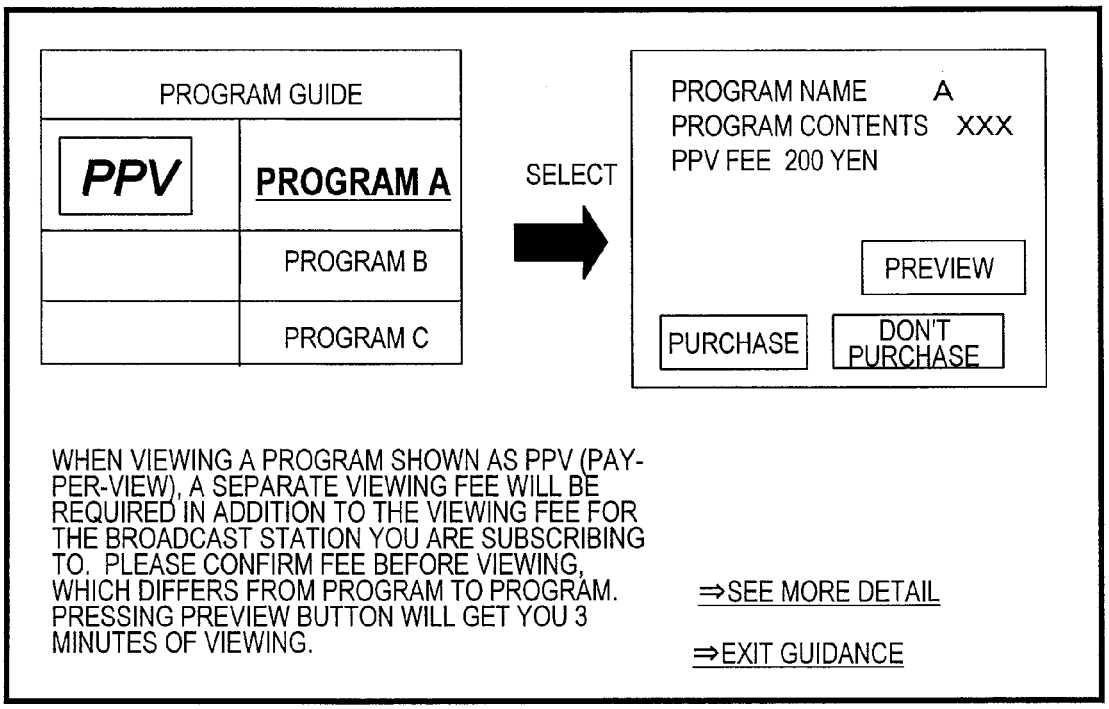
FIG. 17 A diagram showing an output instance of function guidance when viewing CS broadcast.

FIG. 17 shows an output instance of function guidance when viewing CS broadcast. In CS broadcast, it is possible to view programs under a system for billing specific programs (pay-per-view), this mode of broadcast being unique to CS broadcast. Manipulation guidance concerning such a program conforming to pay-per-view can be treated as a unique function of the CS tuner.

In the present embodiment, too, it is possible to make changes as to whether to display or not display subsequent manipulation guidance by rewriting the manipulation guidance output table 81. Rewriting of the manipulation guidance output table 81 is similar to the aforementioned network connection, and the detailed description thereof is omitted.

As described above, by using tuners capable of receiving various broadcast waves as switchable manipulation targets, when newly using a device in which a plurality of them are combined, it is ensured that unnecessary manipulation guidance is not provided for any function which may be a new function but whose manipulation is inferable to the user, and that manipulation guidance is output only for functions of which the manipulation methods or substance of manipulations is unknown. It is also possible to reduce manipulations against unnecessary guidance, thus reducing the user's burden of manipulation.

(Embodiment 4)

A manipulation guidance providing apparatus according to the present embodiment is constructed by adding functions to a guidance providing unit of one of Embodiments 1 to 3.

Specifically, it is possible to update the manipulation guidance output table based on the number of times of outputting manipulation guidance with respect to a function, and on a result of manipulation for a manipulation guidance screen.

In the following description, a guidance providing unit will be described in which a function is added to the guidance providing unit 100 of the recorder 1 of Embodiment 1. A manipulation guidance providing apparatus will be described which, when the user has used a device for a while, outputs manipulation guidance only for necessary manipulations, while no longer providing unnecessary manipulation guidance for manipulations which have already been learned by the user.

In the guidance providing unit 100 of Embodiment 1, outputting of manipulation guidance is determined based on changes in the number and type of usable storage media. This will be effective for manipulations during relatively early stages of beginning to use a different storage medium.

However, if manipulation guidance is output for manipulation information that has already been learned after performing a plurality of times of manipulation, it will become unnecessary manipulation guidance to the user, so that the user may possibly feel disturbed by it.

Accordingly, the manipulation guidance providing apparatus of the present embodiment updates the manipulation guidance output table based on the number of times of outputting manipulation guidance with respect to a function and on a result of manipulation for a manipulation guidance screen. If the number of times of outputting has reached a predetermined number of times, or the time before the manipulation guidance screen is cleared is equal to or less than a predetermined value, it is considered that manipulation guidance is no longer needed, and the manipulation guidance will never be displayed thereafter.

Figure 18:
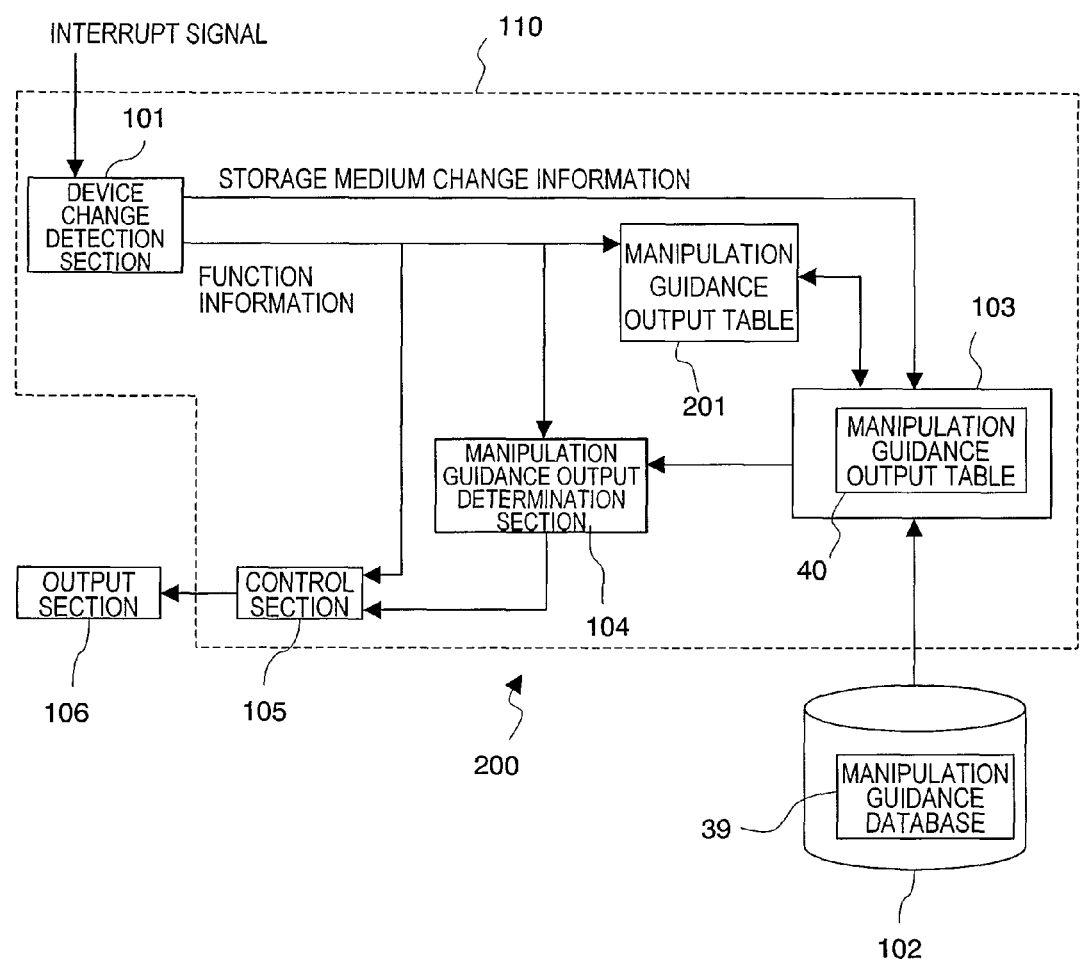
FIG. 18 A diagram showing the functional block construction of a guidance providing unit 200 according to Embodiment 4.

Hereinafter, first referring to FIG. 18, the constituent elements of the manipulation guidance providing apparatus will be described. FIG. 18 shows a functional block construction of the guidance providing unit 200 of the present embodiment. In FIG. 18, component elements which are identical to those in FIG. 3 will be denoted by like reference numerals, and their descriptions will be omitted.

The manipulation guidance providing apparatus shown in FIG. 18 differs from the manipulation guidance providing apparatus shown in FIG. 3 in that a manipulation guidance output table update section 201 is comprised which updates the manipulation guidance output table based on the number of times of outputting manipulation guidance with respect to a function and on a result of manipulation for a manipulation guidance screen.

From an input manipulation of the user acquired from the device change detection section 101 and a manipulation guidance output table which is acquired from the table generation section 103, the manipulation guidance output table update section 201 (hereinafter referred to as the "table update section 201") updates the manipulation guidance output table. The update is performed by using the number of times of outputting manipulation guidance with respect to the same function, a manipulation time for the manipulation guidance screen, and a result of manipulation for the manipulation guidance screen. The specific updating method will be described later.

Figure 19:
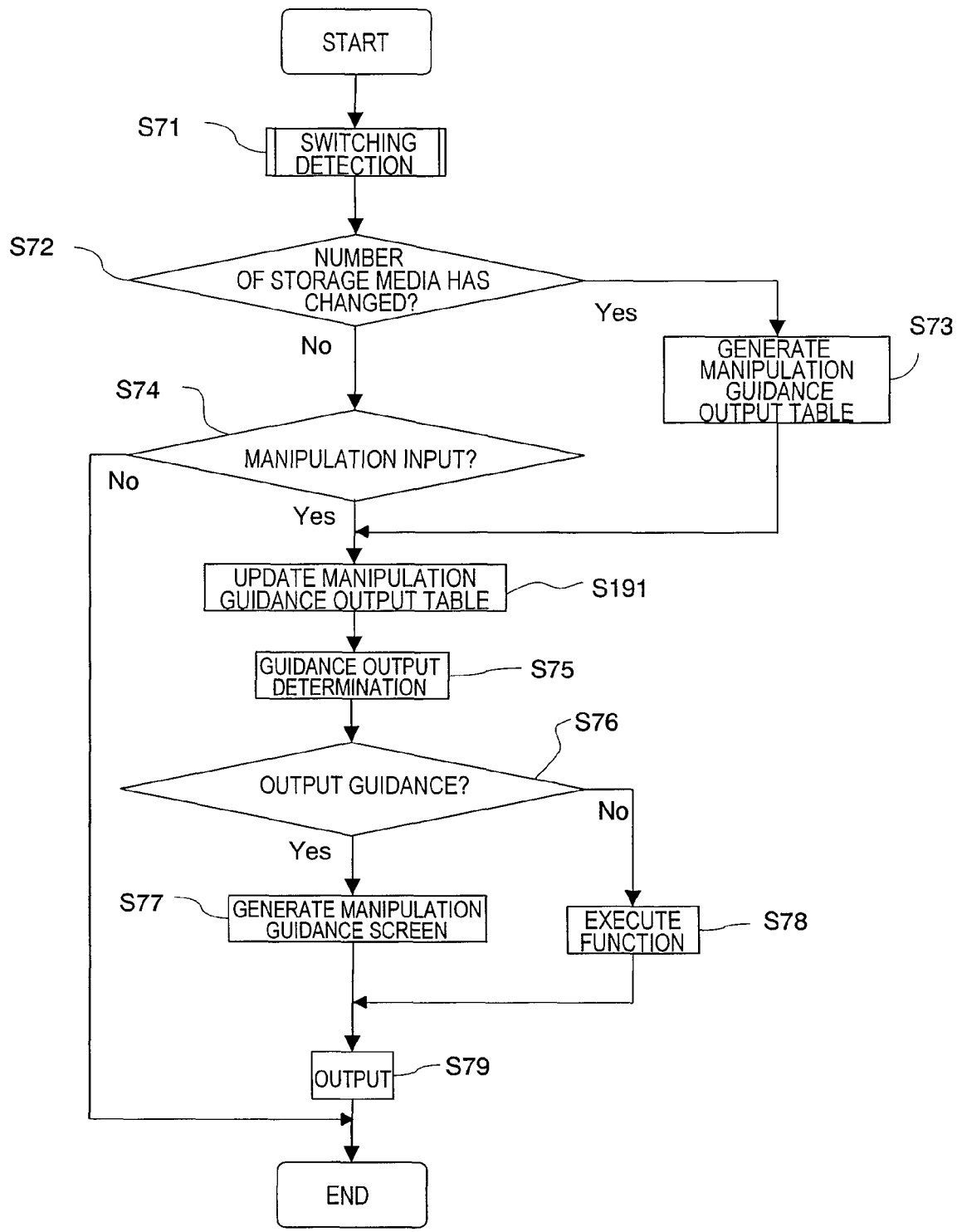
FIG. 19 A flowchart showing a procedure of processing by the guidance providing unit 200.

Description of the Processing by the Guidance Providing Unit 200:

FIG. 19 shows a procedure of processing by the guidance providing unit 200. Those steps of FIG. 19 which are identical to the steps in FIG. 7 will be denoted by like reference numerals, and their descriptions will be omitted. The flow of processes shown in FIG. 19 differs from the flow of processes shown in FIG. 7 in that a manipulation guidance updating step S191 is comprised, in which the manipulation guidance output table is updated by using function information which is detected by the device change detection section.

Hereinafter, step S191 will be described. At step S191, when function information is detected at the device change detection step S71, the table update section 201 updates the manipulation guidance output table by using the detected function information. The details of this process are shown in FIG. 20.

Figure 20:
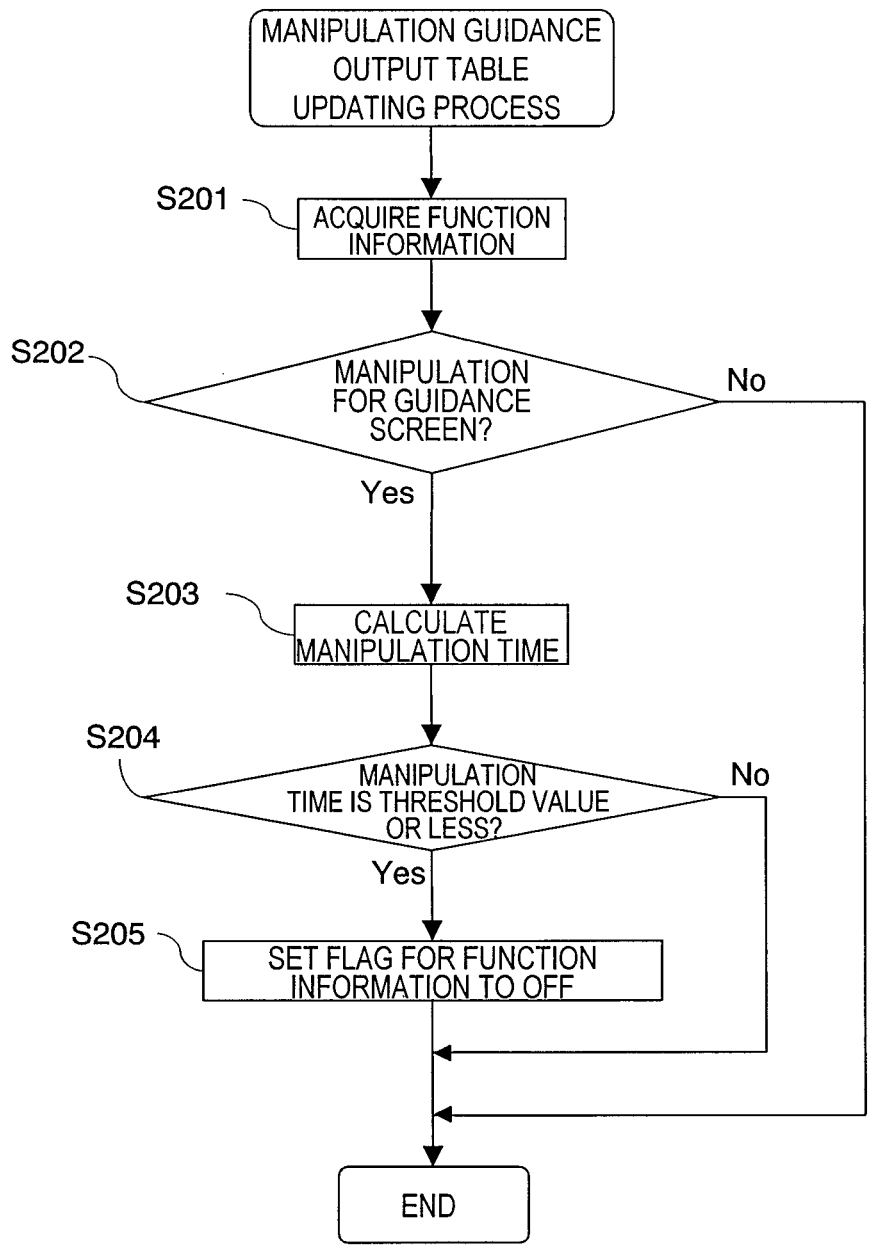
FIG. 20 A flowchart showing a detailed procedure of the process of step S191 in FIG. 19.

FIG. 20 shows a detailed procedure of the process of step S191 in FIG. 19. At step S201, the table update section 201 acquires the function information having been detected in step S71.

At step S202, the table update section 201 determines whether or not the acquired function information concerns a manipulation for a manipulation guidance screen which has been output. If it is a manipulation for a manipulation guidance screen, control proceeds to step S203; if it is not a manipulation for a manipulation guidance screen, the process is ended.

At step S203, the table update section 201 calculates a manipulation time for the manipulation guidance screen. As the calculation method for the manipulation time, a difference between a point in time of displaying the manipulation guidance screen and a point in time at which a manipulation input from the user is made may be determined, for example.

At step S204, the table update section 201 determines whether or not the manipulation time calculated at step S203 is equal to or less than a threshold value. If the manipulation time is equal to or less than the threshold value, control proceeds to step S205; if the manipulation time is not equal to or less than the threshold value, the process is ended. As the threshold value of manipulation time, a value which has been prescribed by the designer may be used, for example. Moreover, the user's manipulation time may always be calculated, and an average value thereof may be used as the threshold value, for example.

At step S205, the table update section 201 updates the function flag or switching flag of a function corresponding to the manipulation guidance which has been output to OFF.

Thus, by performing the processes from step S201 to step S205, when the displaying time for the manipulation screen having been output is equal to or less than a certain time, the switching flag or function flag of the correspond function described in the manipulation guidance output table generated by the manipulation guidance output table can be updated to OFF.

If the manipulation guidance screen is cleared right away, it is considered that the user already knows the manipulation method or substance of manipulation of the function for which guidance has been provided. Through this update, it becomes possible to prevent manipulation guidance for the already-known manipulation from being output from the next time onwards, whereby unnecessary manipulations for the user are reduced, and the burden of manipulation can be decreased.

Alternatively, the manipulation guidance output table may be updated other than by utilizing the user's manipulation time.

For example, by using the substance of function information, the number of times of outputting manipulation guidance may be counted, and when the number of times of outputting manipulation guidance has become equal to or greater than a certain number, the switching flag or function flag of the corresponding function described in the manipulation guidance output table generated by the manipulation guidance output table may be updated to OFF.

Figure 21:
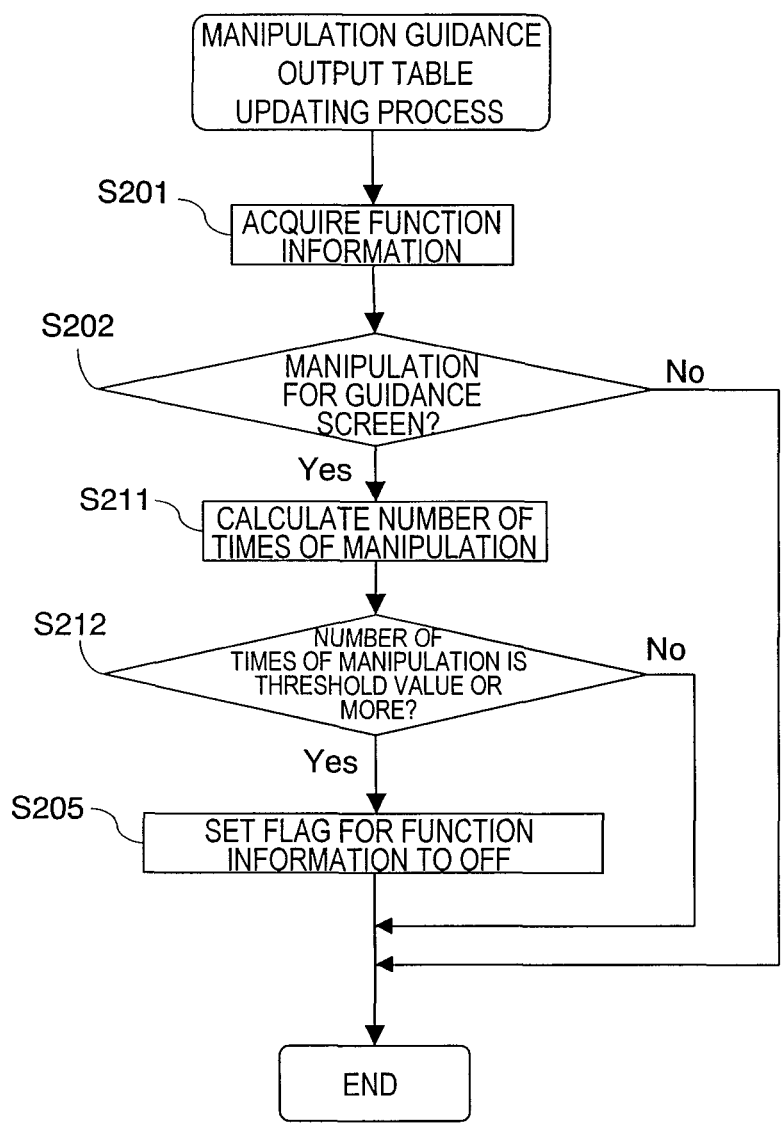
FIG. 21 A flowchart showing a detailed procedure of the process of step S191 according to another updating method.

FIG. 21 shows a detailed procedure of the process of step S191 according to another updating method. Note that Those steps of FIG. 21 which are identical to the steps in FIG. 20 will be denoted by like reference numerals, and their descriptions will be omitted.

The procedure of processing shown in FIG. 21 differs from the procedure of processing shown in FIG. 20 in that the number of times the manipulation guidance has been output for a function is calculated, and update of the manipulation guidance output table is performed according to the calculated number of times.

When step S202 determines that it is a manipulation for a manipulation guidance screen, the table update section 201 calculates at step S211 the number of times of outputting manipulation guidance for the function which is output on the manipulation guidance screen. As the calculation method, the number of times of outputting manipulation guidance for each function may always be stored, for example.

At step S212, the table update section 201 determines whether the number of times of outputting manipulation guidance calculated at step S211 is equal to or less than a threshold value. If the manipulation time is equal to or less than the threshold value, control proceeds to step S205; if the manipulation time is not equal to or less than the threshold value, the process is ended. As the threshold value of the manipulation time, a value which is prescribed by the designer may be used, for example.

Thus, by performing the processes from step S201 to step S205 and step S211 to step S212, the number of times of outputting manipulation guidance is counted, and when the number of times of outputting manipulation guidance has become equal to or greater than a certain number, the switching flag or function flag of the corresponding function described in the manipulation guidance output table generated by the manipulation guidance output table can be updated to OFF. Outputting manipulation guidance a plurality of times with respect to a certain function may constitute unnecessary manipulation guidance if it is an already-learned function. By updating the output determination based on the number of times of manipulation, it becomes possible to prevent such unnecessary manipulation guidance from being output, whereby unnecessary manipulations for the user are reduced, and the burden of manipulation can be decreased.

Moreover, in the manipulation guidance screen in which the substance of function information is output, if a manipulation of selecting not to output manipulation guidance is made, for example, the updating method may update the switching flag or function flag of the corresponding function described in the manipulation guidance output table generated by the manipulation guidance output table to OFF. In order to perform this, an input is required in the manipulation guidance screen for allowing a selection of suppressing display from the next time onwards to be made. If it is possible to receive an update request from the user in the manipulation guidance screen, it becomes possible for the user himself or herself to prevent unnecessary manipulation guidance from being output, whereby unnecessary manipulations for the user are reduced, and the burden of manipulation can be decreased.

Figures 22, 23:
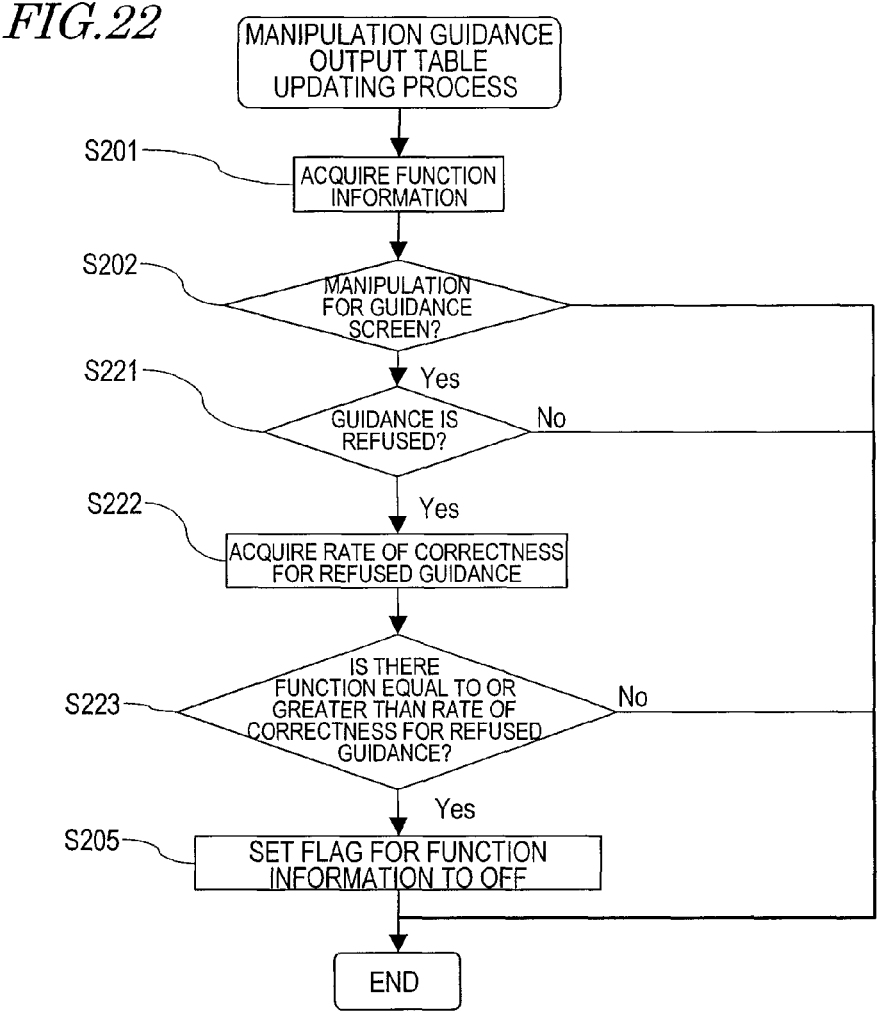
FIG. 22 A flowchart showing a detailed procedure of the process of step S191 according to another updating method.
FIG. 23 A diagram showing an exemplary function/rate-of-correctness database.

FIG. 22 shows a detailed procedure of the process of step S191 according to another updating method. Note that those steps of FIG. 22 which are identical to the steps in FIG. 20 will be denoted by like reference numerals, and their descriptions will be omitted. The procedure of processing shown in FIG. 22 differs from the procedure of processing shown in FIG. 20 in that, by using a rate-of-correctness database for each function of the device, the manipulation guidance output table is updated so as not to present manipulation guidance for any function that has a higher rate of correctness than that of a function which the user has refused guidance.

If step S202 determines that it is a manipulation for the manipulation guidance screen, at the following step S221, the table update section 201 determines whether the presented manipulation guidance is refused or not. As the determination method, it may determined that the guidance is refused if the time at which the guidance is presented until the time at which "Exit guidance" is selected in the guidance screen shown in FIG. 6 is equal to or less than a threshold value (e.g. 3 seconds or less), for example. When determining that the guidance is refused, the table update section 201 proceeds to step S222; when determining that the guidance is not refused, the process is ended without performing an updating process of the manipulation guidance output table.

At step S222, by referring to a function/rate-of-correctness database which is separately prepared, the table update section 201 acquires an average rate of correctness concerning the function for which guidance is refused at step S221.

The function/rate-of-correctness database is stored in the database storing section 102. FIG. 23 shows an exemplary function/rate-of-correctness database 230. As shown in FIG. 23, the function/rate-of-correctness database 230 is generated by associating each function of the guidance-outputting device with an average rate of correctness for the function. As has been illustrated with respect to the aforementioned DVD recorder manipulation experiment, an average rate of correctness can be obtained by performing in advance a manipulation experiment concerning each function for a plurality of users. For example, if the function for which guidance is refused at step S221 is "Play" for "HDD" in FIG. 23, then the average rate of correctness for this function is 0.8. Note that the "average rates of correctness" that are associated with the functions of the device are exemplary. This value may be a fixed value, or may be a value which fluctuates depending on the user.

At step S223, the table update section 201 determines whether or not any function exists that has a value which is equal to or greater than the acquired rate of correctness. If such functions exist, those functions are sent to step S205, where the table is updated so that manipulation guidance will not be output. On the other hand, if no such functions exist, the table update section 201 does not perform any updating process of the manipulation guidance output table, and the process is ended. As the determination method for the presence or absence of the functions, the average rates of correctness in the function/rate-of-correctness database 230 mentioned above may be referred to. Specifically, if the rate of correctness received from step S222 is 0.8, there are six functions whose rate of correctness is equal to or greater than 0.8 in FIG. 23, i.e., "Fast-forward HDD" "Play DVD" "Fast-forward DVD" "Play VIDEO" "Record on VIDEO" "Fast-forward VIDEO", and so the function flags of these functions are updated to OFF.

Thus, by performing the processes from step S201 to step S205 and step S221 to step S223, for any function that is above a rate of correctness of the case where manipulation guidance is refused, the table update section 201 updates its function flag in the manipulation guidance output table to OFF.

The value of the average rate of correctness for manipulations is in inverse proportion to the user's manipulation proficiency for the device. In other words, a function having a high average rate of correctness would be inferable to a user with a high proficiency even if it is a new function, and the manipulation guidance for any such function would be unnecessary guidance. Therefore, by regarding as the user's proficiency level for the device the rate of correctness of a function for which guidance has been refused, and ensuring that guidance is not output for any function having a higher rate of correctness, outputting of unnecessary manipulation guidance to the user is reduced, whereby the burden of manipulation can be decreased.

Note that the functions to be subjected to the determination of step S223 may be limited to the storage medium currently being used. For example, if manipulation guidance which is output for DVD is refused, the prospective functions to be updated may be limited to DVD functions only. It is presumable that proficiency for a device may greatly differ depending on the storage medium, e.g., as in the case of a user who is familiar with VCR manipulations but is new to hard disk manipulations. Therefore, by limiting the range of functions to be subjected to determination to this storage medium, failure to output necessary guidance can be avoided.

Moreover, at step S223, update of the manipulation guidance output table may not be performed for those functions whose average rates of correctness are equal to or less than a threshold value (e.g. 0.3 or less), even if they are equal to or greater than the rate of correctness of the function for which the user has refused presentation of guidance. In other words, update of the manipulation guidance output table may be performed for only those functions which are equal to or greater than the rate of correctness of the function for which the user has refused presentation of guidance and whose average rates of correctness are greater than the threshold value.

For those functions whose average rates of correctness are lower than the threshold value, it is preferable to present manipulation guidance even to a user with a high proficiency, and it is considered that there is little probability that all manipulation guidance is unnecessary. Therefore, even if one function with a low rate of correctness has been correctly answered, it may still be unclear as to whether the manipulation methods have been correctly mastered for the manipulations of the other functions as well. Thus, by ensuring that manipulation guidance is output at least once for such functions having low average rates of correctness, failure to output necessary guidance can be avoided.

Thus, by performing the processes of steps S71 to S79 and step S191, it is possible to update the manipulation guidance output table based on the number of times of outputting manipulation guidance with respect to a function and on a result of manipulation for a manipulation guidance screen.

Thus, in accordance with the manipulation guidance providing apparatus of the present embodiment, it is possible to update the manipulation guidance output table based on the number of times of outputting manipulation guidance with respect to a function and on a result of manipulation for a manipulation guidance screen, and output manipulation guidance only for necessary manipulations, while no longer providing unnecessary manipulation guidance for manipulations which have already been learned by the user.

Industrial Applicability

When a device having a plurality of storage media is newly used, in response to a change in the number of storage media, a manipulation guidance providing apparatus according to the present invention outputs guidance on switching manipulations for storage media common to a plurality of functions, and in response to a change in the type of storage medium, outputs manipulation guidance only for differential functions belonging to the newly added storage medium. Thus, even if it is a new function emerging at the addition of a new storage medium, no unnecessary manipulation guidance is provided for any function of which the user is able to infer the manipulation, so that manipulation guidance is only output for functions of which the manipulation methods or substance of manipulations is unknown. This is effective for assisting in the understanding of manipulations and preventing wrong manipulations among devices which have the same type of functions but differ in the number or type of storage media, e.g., recording devices such as DVD, content browsing devices such as TV, and communications devices such as mobile phones. Moreover, with respect to devices connected to a network, e.g., PCs, by regarding the data at the connection destination as a storage medium, it becomes possible to provide manipulation guidance on a similar basis, which is effective for assisting in the understanding of manipulations and preventing wrong manipulations.

The invention claimed is:

1. An electronic device operating by switching between a plurality of types of manipulation targets, comprising:
   a computer readable storage medium that stores a database containing data of a guidance sentence concerning a switching manipulation for manipulation targets and data of guidance sentences concerning manipulations of executing functions assigned to the respective manipulation targets; and
   a processor configured to execute program code stored on a non-transitory computer readable medium, the processor being configured to execute the code to perform the steps of:
   detecting a switching of manipulation targets;
   generating a table based on the database in response to the detected switching of manipulation targets, such that the functions of the manipulation targets are classified in the table each into a common function to be executed commonly for manipulation targets before and after a switching manipulation or a unique function not to be executed commonly;
   when a function designated by a user to be executed pertains to the common function, determining that a confirmation message concerning a switching of manipulation targets is to be presented, and when a function designated by a user to be executed pertains to the unique function, determining that the confirmation message and another confirmation message concerning the designated function are to be presented; and
   outputting a presentation signal for presenting the confirmation message.

2. The electronic device of claim 1, wherein the plurality of types of manipulation targets are a plurality of types of storage media.

3. The electronic device of claim 1, further comprising a terminal for transmitting a request signal onto a network and receiving an answer signal to the request signal, wherein,
   the plurality of types of manipulation targets are a plurality of servers providing different services, each of the plurality of servers being capable of receiving the request signal via the network and transmitting an answer signal for providing a service in accordance with the request signal.

4. The electronic device of claim 1, wherein the plurality of types of manipulation targets are a plurality of types of tuners each capable of receiving a broadcast signal of a different broadcasting system.

5. The electronic device of claim 1, wherein the processor detects a change in at least one of a number and type of manipulation targets as a change in the manipulation targets.

6. The electronic device of claim 2, wherein,
each storage medium is removable;
the processor detects a change from a state where no storage medium is loaded to a state where one storage medium is loaded; and
the processor generates a table in which a function to be executed by using the loaded storage medium is classified into a predetermined one of the common function and the unique function.

7. The electronic device of claim 1, wherein the processor generates a table in which a switching flag indicating whether or not to present the confirmation message concerning the switching and a function flag indicating whether or not to present the confirmation message concerning the function are set for each function.

8. The electronic device of claim 7, wherein, for any function pertaining to the common function, the processor sets a switching flag indicating that the confirmation message concerning the switching is to be presented, and sets a function flag indicating that the confirmation message concerning the function is not to be presented.

9. The electronic device of claim 7, wherein, for any function pertaining to the unique function, the processor sets a switching flag indicating that the confirmation message concerning the switching is to be presented, and sets a function flag indicating that the confirmation message concerning the function is to be presented.

10. The electronic device of claim 8, wherein the processor determines based on the switching flag that the confirmation message concerning the switching is to be presented, and determines based on the function flag that the confirmation message concerning the function is to be presented.

11. The electronic device of claim 7, wherein the processor further is configured to execute the code to perform the step of updating the table, wherein,
after presenting the confirmation message concerning the switching or the confirmation message concerning the function, the processor changes the corresponding switching flag or function flag so as to indicate that the confirmation message is not to be presented.

12. The electronic device of claim 11, wherein, when an instruction to cancel the message is received after presenting the confirmation message, the processor changes the corresponding switching flag or function flag so as to indicate that the confirmation message is not to be presented.

13. The electronic device of claim 11, wherein, when an elapsed time since the confirmation message is presented and until a response from the user is received is equal to or less than a predetermined time, the processor changes the corresponding switching flag or function flag so as to indicate that the confirmation message is not to be presented.

14. The electronic device of claim 11, wherein the processor retains a number of times of presenting the confirmation message, and when the number of times of presenting is equal to or greater than a predetermined number of times, the processor changes the corresponding switching flag or function flag so as to indicate that the confirmation message is not to be presented.

15. The electronic device of claim 13, wherein,
the storage medium further stores a rate-of-correctness database in which a plurality of functions for which to output confirmation messages and a rate of correctness for each of the plurality of functions are associated; and
the processor refers to the rate-of-correctness database to acquire a rate of correctness corresponding to a function subjected to an update for indicating that the confirmation message is not to be presented, and among the plurality of functions defined in the rate-of-correctness database, for any function associated with a rate of correctness equal to or greater than the acquired rate of correctness, changes the corresponding function flag so as to indicate that the confirmation message is not to be presented.

16. The electronic device of claim 15, wherein,
each of the plurality of functions is classified according to the type of storage medium used; and
among the plurality of functions defined in the rate-of-correctness database, for any function which belongs to the same classification as the function subjected to an update for indicating that the confirmation message is not to be presented and which is associated with a rate of correctness equal to or greater than the acquired rate of correctness, the processor changes the corresponding function flag so as to indicate that the confirmation message is not to be presented.

17. The electronic device of claim 15, wherein the processor retains a predetermined threshold value concerning rates of correctness, and among the plurality of functions defined in the rate-of-correctness database, for any function associated with a rate of correctness which is equal to or greater than the acquired rate of correctness and which is greater than the threshold value, changes the corresponding function flag so as to indicate that the confirmation message is not to be presented.

18. The electronic device of claim 17, wherein, among the plurality of functions defined in the rate-of-correctness database, for any function associated with a rate of correctness equal to or less than the threshold value, the processor changes the corresponding function flag so as to indicate that the confirmation message is to be presented at least once.

19. A manipulation guidance providing apparatus for use in an electronic device operating by switching between a plurality of types of manipulation targets, the apparatus comprising:
a computer readable storage medium that stores a database containing data of a guidance sentence concerning a switching manipulation for manipulation targets and data of guidance sentences concerning manipulations of executing functions assigned to the respective manipulation targets; and
a processor configured to execute program code stored on a non-transitory computer readable medium, the processor being configured to execute the code to perform the steps of:
detecting a switching of manipulation targets;
generating a table based on the database in response to the detected switching of manipulation targets, such that the functions of the manipulation targets are classified in the table each into a common function to be executed commonly for manipulation targets before and after a switching manipulation or a unique function not to be executed commonly;
when a function designated by a user to be executed pertains to the common function, determining that a confirmation message concerning a switching of manipulation targets is to be presented, and when a function designated by a user to be executed pertains to the unique function, determining that the confirmation message and another confirmation message concerning the designated function are to be presented; and
outputting a presentation signal for presenting the confirmation message.

20. The electronic device of claim 9, wherein the processor determines based on the switching flag that the confirmation message concerning the switching is to be presented, and determines based on the function flag that the confirmation message concerning the function is to be presented.

* * * * *